United States Patent
Watanabe

(10) Patent No.: US 6,889,791 B2
(45) Date of Patent: May 10, 2005

(54) NORMAL TRAVEL SECURING DEVICE FOR AUTOMOBILE EQUIPPED WITH ACCELERATOR MAL-OPERATION PREVENTER

(76) Inventor: Masaei Watanabe, 61-13, Mitsufuji 1-chome, Musashimurayama-shi, Tokyo (JP)

(*) Notice: Subject to any disclaimer, the term of this patent is extended or adjusted under 35 U.S.C. 154(b) by 165 days.

(21) Appl. No.: 10/343,057

(22) PCT Filed: Aug. 7, 2001

(86) PCT No.: PCT/JP01/06770
§ 371 (c)(1),
(2), (4) Date: Jan. 27, 2003

(87) PCT Pub. No.: WO02/12693
PCT Pub. Date: Feb. 14, 2002

(65) Prior Publication Data
US 2004/0000444 A1 Jan. 1, 2004

(30) Foreign Application Priority Data
Aug. 8, 2000 (JP) .................................... 2000-239973

(51) Int. Cl.[7] ........................... B60K 28/10; G05G 1/14
(52) U.S. Cl. ........................... 180/271; 74/512; 74/560
(58) Field of Search .................. 180/271, 501.5 R, 180/512, 560; 403/DIG. 1

(56) References Cited

U.S. PATENT DOCUMENTS

| 3,207,276 A | * | 9/1965 | David et al. ............ 477/207 |
| 5,193,640 A | * | 3/1993 | Lee ........................ 180/271 |
| 5,477,940 A | * | 12/1995 | Brister et al. ............ 180/292 |
| 5,797,467 A | | 8/1998 | Watanabe |

FOREIGN PATENT DOCUMENTS

| JP | 4-159433 A | 6/1992 |
| JP | 6-156111 A | 6/1994 |
| JP | 11-278092 A | 10/1999 |
| JP | 2000-264097 A | 9/2000 |

* cited by examiner

Primary Examiner—Paul N. Dickson
Assistant Examiner—Laura B. Rosenberg
(74) Attorney, Agent, or Firm—Pearne & Gordon LLP

(57) ABSTRACT

Although an accelerator interlocking member (26) and an acceleration function follow-up member (28) magnetically coupled with each other when an automobile stops or travels at a car speed less than a predetermined speed are released from the magnetic coupling when an accelerator erroneous operation is made, a normal operation security apparatus (100) serves to lock the accelerator interlocking member and the acceleration function follow-up member so that they are mechanically coupled whereby the accelerator interlocking member and the acceleration function follow-up member are integrally coupled with each other to prevent the release of the magnetic coupling of them on a normal operation so as to be enable to positively perform the overtaking operation and the ascent hill travel.

13 Claims, 21 Drawing Sheets

FIG. 15
(A)
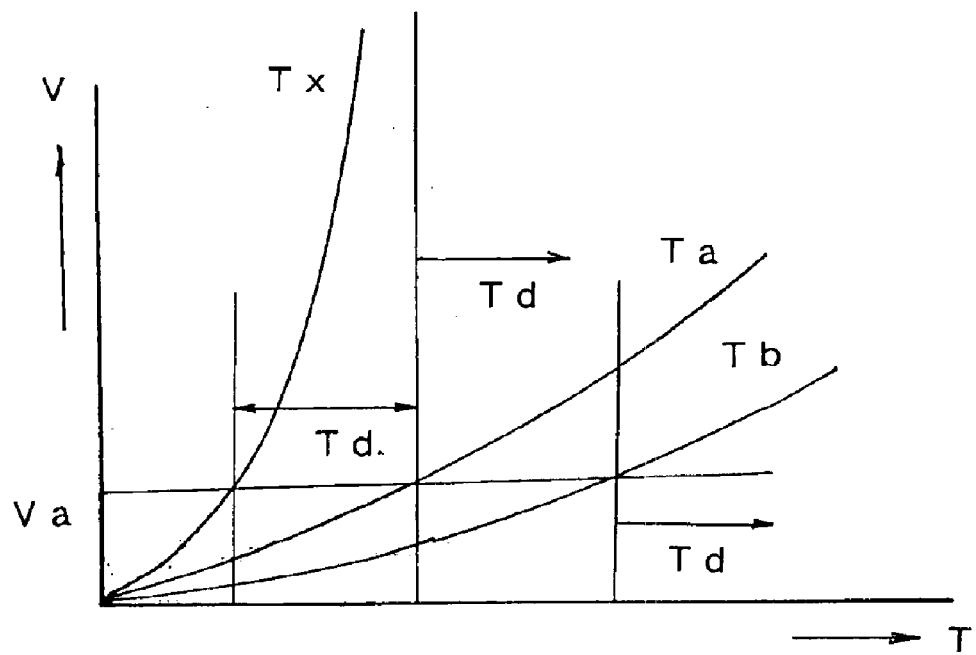
(B)
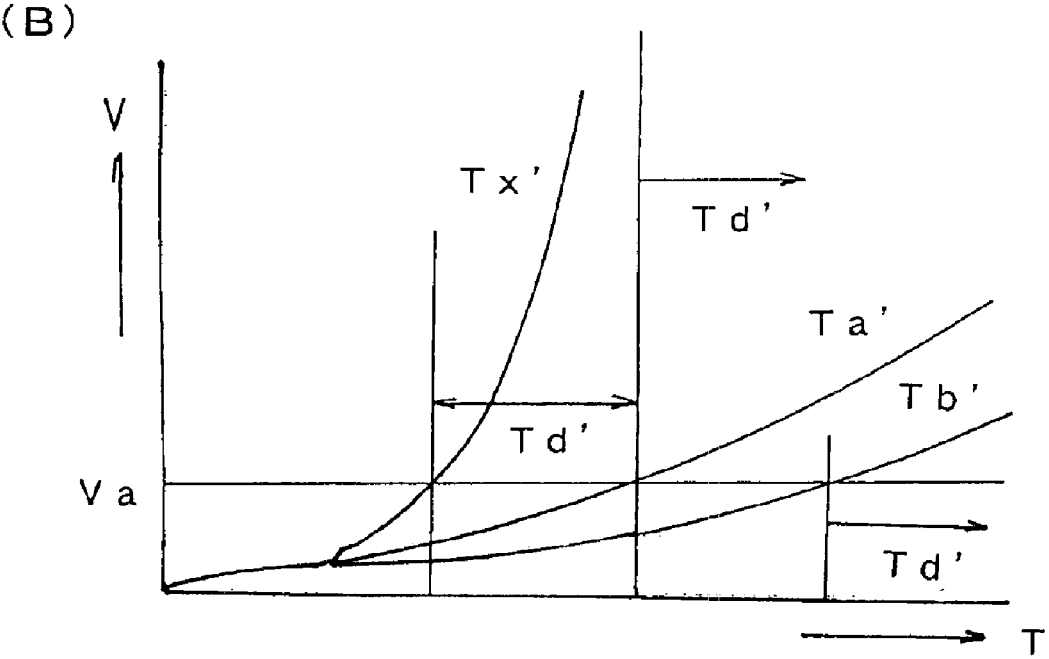

FIG. 18
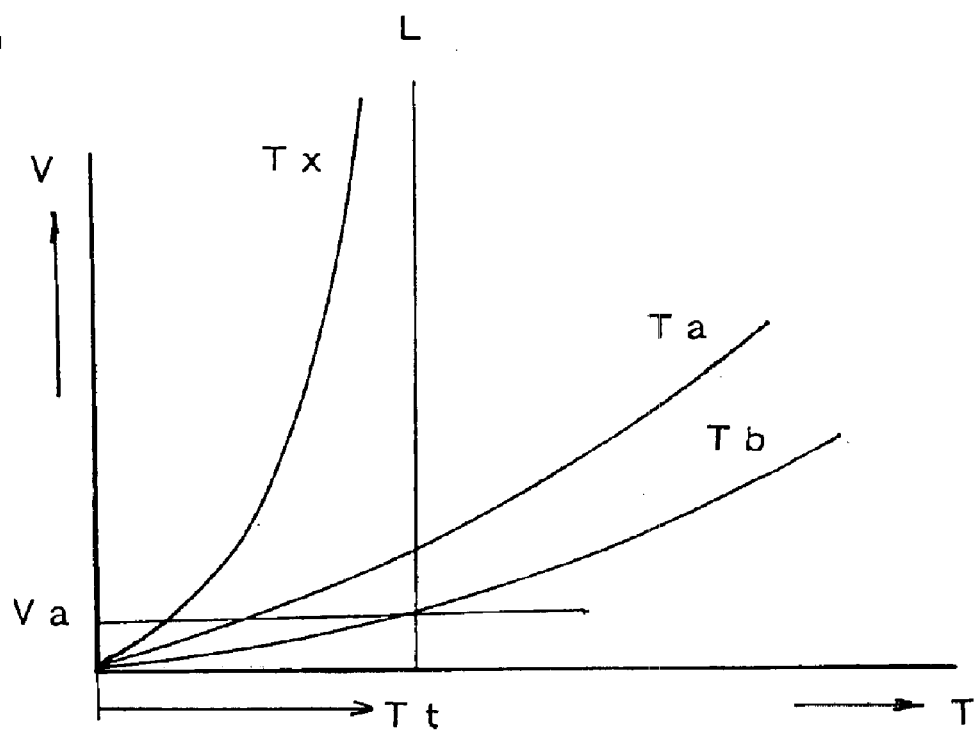
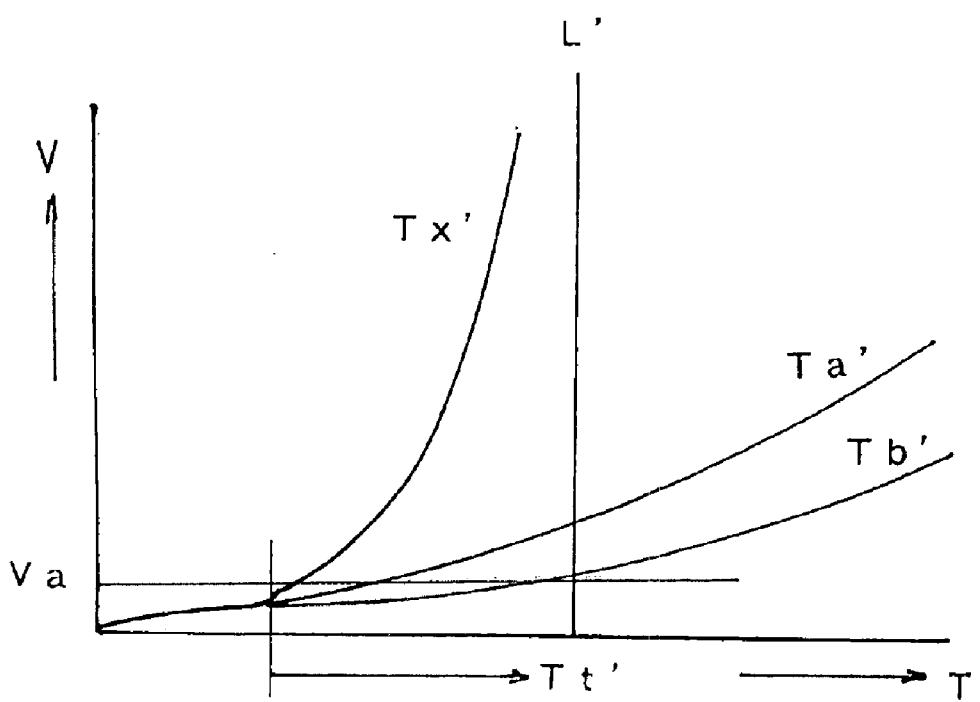

NORMAL TRAVEL SECURING DEVICE FOR AUTOMOBILE EQUIPPED WITH ACCELERATOR MAL-OPERATION PREVENTER

TECHNICAL FIELD

This invention relates to an automobile equipped with an apparatus for preventing an accelerator of a vehicle such as a gasoline engine automobile or an electric vehicle on which an automatic transmission is mounted from being erroneously operated by stopping an acceleration operation when the accelerator pedal is erroneously pushed down in order to prevent the vehicle from being accelerated even though the accelerator pedal is pushed down in spite of the vehicle being intended to be braked and more particularly to a normal travel security apparatus for an automobile adapted to allow the automobile to travel in a normal state without operating the accelerator erroneous operation prevention apparatus although the accelerator pedal is pushed down with a pedaling stroke more than a normal pedaling stroke for the purpose of overtaking or hill climbing when this kind of car is running in an normal state.

BACKGROUND OF THE INVENTION

There have been various apparatuses for preventing an automobile from being accelerated although an accelerator pedal is accidentally pushed down in spite of the driver's intention to apply a brake in order to brake the automobile in the operation of the automobile and the present applicant has proposed a practical apparatus adapted to prevent the acceleration of the automobile when the accelerator pedal is accidentally pushed down (see WO95/31349 and U.S. Pat. No. 5,797,467, for example).

This apparatus comprises an accelerator interlocking member interlocking with an accelerator pedal, an acceleration function follow-up member associated with speed adjustment means such as a throttle valve of a gasoline automobile or a speed variable signal generator of an electric car and magnetic coupling means to magnetically couple the accelerator interlocking member and the acceleration function follow-up member with each other in a normal state and coupling release means to release the magnetic coupling of the accelerator interlocking member and the acceleration function follow-up member when the accelerator pedal is erroneously pushed down in place of a brake pedal.

This apparatus is so constructed that the acceleration function is never damaged when the accelerator pedal is pushed down for the purpose of the normal acceleration, but the acceleration of the car is prevented by releasing the magnetic coupling of the accelerator interlocking member and the acceleration function follow-up member when the accelerator pedal is erroneously pushed down with an abnormal pedaling force while mistaken for the brake pedal.

The release of this magnetic coupling is performed by a shock power, which occurs when the accelerator pedal is pushed down by the abnormal pedaling force or by an engagement of the acceleration function follow-up member against a second stop member caused by the displacement of the accelerator pedal beyond the displacement quantity required for the normal acceleration function by deforming a first stop member with the abnormal pedaling force of the accelerator pedal.

Especially, since the erroneous operation of the accelerator is detected by deforming the first stop member due to the engagement of the accelerator pedal or its interlocking member against the first stop member when the accelerator pedal is pushed down with the large pedaling force beyond the pedaling stroke required when the normal travel of the car is performed, the apparatus proposed by the applicant is more practical than the other prior accelerator erroneous operation prevention apparatuses in which the erroneous operation of the accelerator is prevented by detecting only the pedaling stroke of the accelerator pedal.

Also, since this apparatus proposed by the applicant magnetically couples the accelerator interlocking member with the acceleration function follow-up member, as the driver removes its foot far away from the accelerator pedal when the driver notices the erroneous operation of the accelerator pedal, the accelerator interlocking member and the acceleration function follow-up member are again magnetically coupled by springs urged thereto so that the original condition is restored. Thus, a special restoration operation of the apparatus for getting the original condition is not required and therefore high convenience can be gotten in the actual use.

This apparatus comprises lock means to mechanically couple the accelerator interlocking member and the acceleration function follow-up member with each other so as to prevent the function of the coupling release means. Since the driver manually operates this lock means by means of a change-over switch or the like with the driver's intention, it will be used based on the driver's belief that the erroneous operation of the accelerator never happens.

Since the erroneous operation of the accelerator happens due to the error of the driver when the car is stopping or starts and therefore the driver operates the accelerator pedal with its consciousness after the car enters the normal travel, the erroneous operation of the accelerator never happens thereafter. Thus, when the car enters the normal travel, the accelerator erroneous operation prevention apparatus is not required to work and the accelerator pedal is sometimes pushed down quickly with a large force in the case where the overtaking operation is performed during a high-speed travel on a highway or during an uphill travel. In these cases, the manual operation of the lock means is troublesome and the travel of the car while overlooking the lock operation should be avoided.

The object of the invention is to provide a normal travel security apparatus for an automobile equipped with an accelerator erroneous operation prevention apparatus adapted to never perform an accelerator erroneous operation prevention function while the automobile is traveling in a normal state without any occurrence of the accelerator erroneous operation.

DISCLOSURE OF THE INVENTION

The first feature of the invention is to provide a normal travel security apparatus for an automobile equipped with an accelerator erroneous operation prevention apparatus comprising magnetic coupling means to magnetically couple with each other in a normal state an accelerator interlocking member interlocking with an accelerator pedal of the automobile and an acceleration function follow-up member associated with speed adjustment means such as a throttle valve of a gasoline automobile or a speed variable signal generator of an electric car, coupling release means to release the magnetic coupling of the accelerator interlocking member and the acceleration function follow-up member when the accelerator pedal is erroneously pushed down in place of a brake pedal and lock means to lock the coupling release means so that the coupling release means never works by mechanically coupling the accelerator interlocking member and the acceleration function follow-up member, the normal travel security apparatus characterized by comprising lock activation means to keep a lock state of the lock means when the automobile travels at a speed equal to or higher than a predetermined speed based on a normal operation of the automobile.

The second feature of the invention is to provide a normal travel security apparatus for an automobile equipped with an accelerator erroneous operation prevention apparatus comprising magnetic coupling means to magnetically couple with each other in a normal state an accelerator interlocking member interlocking with an accelerator pedal of the automobile and an acceleration function follow-up member associated with speed adjustment means such as a throttle valve of a gasoline automobile or a speed variable signal generator of an electric car, coupling release means to release the magnetic coupling of the accelerator interlocking member and the acceleration function follow-up member when the accelerator pedal is erroneously pushed down in place of a brake pedal and lock means to lock the coupling release means so that the coupling release means never works by mechanically coupling the accelerator interlocking member and the acceleration function follow-up member, the normal travel security apparatus characterized by comprising car speed detection means to detect a car speed of the automobile and lock activation means to keep a lock state of the lock means when it is judged that the car speed detected by the car speed detection means is of a value equal to or higher than a predetermined speed and that the car speed equal to or higher than the predetermined speed is based on a normal operation of the automobile.

The third feature of the invention is to provide a normal travel security apparatus for an automobile equipped with an accelerator erroneous operation prevention apparatus according to either of the first and second features and wherein the lock means comprises an actuator provided between the accelerator interlocking member and the acceleration function follow-up member and operated while electrically controlled so that the accelerator interlocking member and the acceleration function follow-up member are mechanically coupled or the coupling of them is released and wherein the lock release means comprises a coupling signal generation circuit to generate a coupling signal to drive the actuator so that the accelerator interlocking member and the acceleration function follow-up member are mechanically coupled.

The fourth feature of the invention is to provide a normal travel security apparatus for an automobile equipped with an accelerator erroneous operation prevention apparatus comprising magnetic coupling means to magnetically couple with each other in a normal state an accelerator interlocking member interlocking with an accelerator pedal of the automobile and an acceleration function follow-up member associated with speed adjustment means such as a throttle valve of a gasoline automobile or a speed variable signal generator of an electric car, coupling release means to release the magnetic coupling of the accelerator interlocking member and the acceleration function follow-up member when the accelerator pedal is erroneously pushed down in place of a brake pedal and lock means to lock the coupling release means so that the coupling release means never works by mechanically coupling the accelerator interlocking member and the acceleration function follow-up member, the normal travel security apparatus characterized by comprising car speed detection means to detect a car speed of the automobile and lock activation means to keep a lock state of the lock means with a predetermined time lag after the car speed detection means detects the car speed equal to or higher than a predetermined speed.

The fifth feature of the invention is to provide a normal travel security apparatus for an automobile equipped with an accelerator erroneous operation prevention apparatus comprising magnetic coupling means to magnetically couple with each other in a normal state an accelerator interlocking member interlocking with an accelerator pedal of the automobile and an acceleration function follow-up member associated with speed adjustment means such as a throttle valve of a gasoline automobile or a speed variable signal generator of an electric car, coupling release means to release the magnetic coupling of the accelerator interlocking member and the acceleration function follow-up member when the accelerator pedal is erroneously pushed down in place of a brake pedal and lock means to lock the coupling release means so that the coupling release means never works by mechanically coupling the accelerator interlocking member and the acceleration function follow-up member, the normal travel security apparatus characterized by comprising car speed detection means to detect a car speed of the automobile, travel time detection means to detect a travel time after the automobile starts to be accelerated from a state of the car speed lower than the predetermined speed and lock activation means to keep a lock state of the lock means when the car speed detection means detects the car speed equal to or higher than the predetermined speed and the travel time detection means detects the predetermined travel time.

The sixth feature of the invention is to provide a normal travel security apparatus for an automobile equipped with an accelerator erroneous operation prevention apparatus according to either of the fourth and fifth features and wherein the lock means comprises an actuator provided between the accelerator interlocking member and the acceleration function follow-up member and operated while electrically controlled so that the accelerator interlocking member and the acceleration function follow-up member are mechanically coupled or the coupling of them is released and wherein the lock release means comprises a coupling signal generation circuit to generate a coupling signal to drive the actuator so that the accelerator interlocking member and the acceleration function follow-up member are mechanically coupled, the coupling signal generation circuit serving to generate the coupling signal when the coupling signal generation circuit receives a car speed detection signal corresponding to the car speed equal to or higher than the predetermined value from the car speed detection means and a travel time detection signal for detecting the predetermined travel time after the acceleration from the travel time detection means or with a predetermined time lag after the coupling signal generation circuit receives the car speed corresponding to the car speed equal to or higher than the predetermined car speed.

In this manner, as the lock means to be operated so that the accelerator interlocking member and the acceleration function follow-up member are mechanically coupled when the car speed equal to or higher than the predetermined value on the normal operation of the car is detected is kept in the lock state, the accelerator erroneous operation prevention apparatus can be prevented from working in the normal travel state of the car without any troublesome operation of the driver's manually switching. Thus, especially, even though the accelerator is pushed down quickly with a large force, which happens when the overtaking travel or uphill travel is performed, the accelerator erroneous operation prevention apparatus never works and therefore the overtaking travel can be rapidly effected.

As the lock means is kept in the lock state not only when the car speed equal to or higher than the predetermined value is detected, but also when the predetermined time lag after the car speed reaches the predetermined value or when the predetermined travel time elapses after the acceleration starts from the state where the car travels at the speed lower than the predetermined car speed, the car speed equal to or higher than the predetermined value can be distinguished from the short time acceleration based on the accelerator erroneous operation and therefore there arises no trouble for the function of the accelerator erroneous operation prevention.

The seventh feature of the invention is to provide a normal travel security apparatus for an automobile equipped with an accelerator erroneous operation prevention apparatus according to either of the first through sixth features and wherein the magnetic coupling means, the coupling release means and the lock means are disposed within a casing to be attached to a car body, the acceleration function follow-up member and the accelerator interlocking member of the magnetic coupling means are pivotally supported on and within the casing and the accelerator interlocking member is connected by a connecting member extending through an extension hole in the casing to an accelerator arm to which an accelerator pedal is attached.

In this manner, as the magnetic coupling means, the coupling release means and the lock means are disposed within the casing to be attached to the car body, the operation for attaching the accelerator interlocking member of the magnetic coupling means to the accelerator arm is preferably not required because the accelerator erroneous operation prevention apparatus can be removably attached separately from the car body. Since the acceleration function follow-up member and the accelerator interlocking member of the magnetic coupling means are pivotally supported within the casing, there is prevented the coupling sound of both of the members tending to occur when these members are coupled and uncoupled by the linear movement of them and the bonding of the members and the release of the bonding can be smoothly and precisely performed.

Especially, as there are provided an acceleration function side buffer member against which the acceleration function follow-up member abuts in a non-acceleration state of the acceleration function follow-up member and an accelerator side buffer member against which the accelerator interlocking member abuts at the position beyond the maximum acceleration position of the accelerator interlocking member, there can be prevented the occurrence of the abutting sound when the members abut against each other on the maximum acceleration and on the stop of the acceleration function as well as the coupling sound when the members are coupled with each other. Thus, the occurrence of the sounds by the operation of the accelerator pedal of the automobile including the erroneous operation prevention can be effectively prevented.

BRIEF DESCRIPTION OF THE DRAWINGS

FIG. 15 shows the relationship between a car speed V and a travel time T for illustrating the operation of the apparatus of FIG. 14 wherein FIG. 15(A) is a diagram showing the state where the automobile is accelerated from the stop state while FIG. 15(B) is a diagram showing the state where the automobile is accelerated from the low speed travel state;

FIG. 18 shows the relationship between a car speed V and a travel time T for illustrating the operation of the apparatus of FIG. 17 wherein FIG. 18(A) is a diagram showing the state where the automobile is accelerated from the stop state while FIG. 18(B) is a diagram showing the state where the automobile is accelerated from the low speed travel state;

BEST MODE OF CARRYING OUT THE INVENTION

Figure 1:
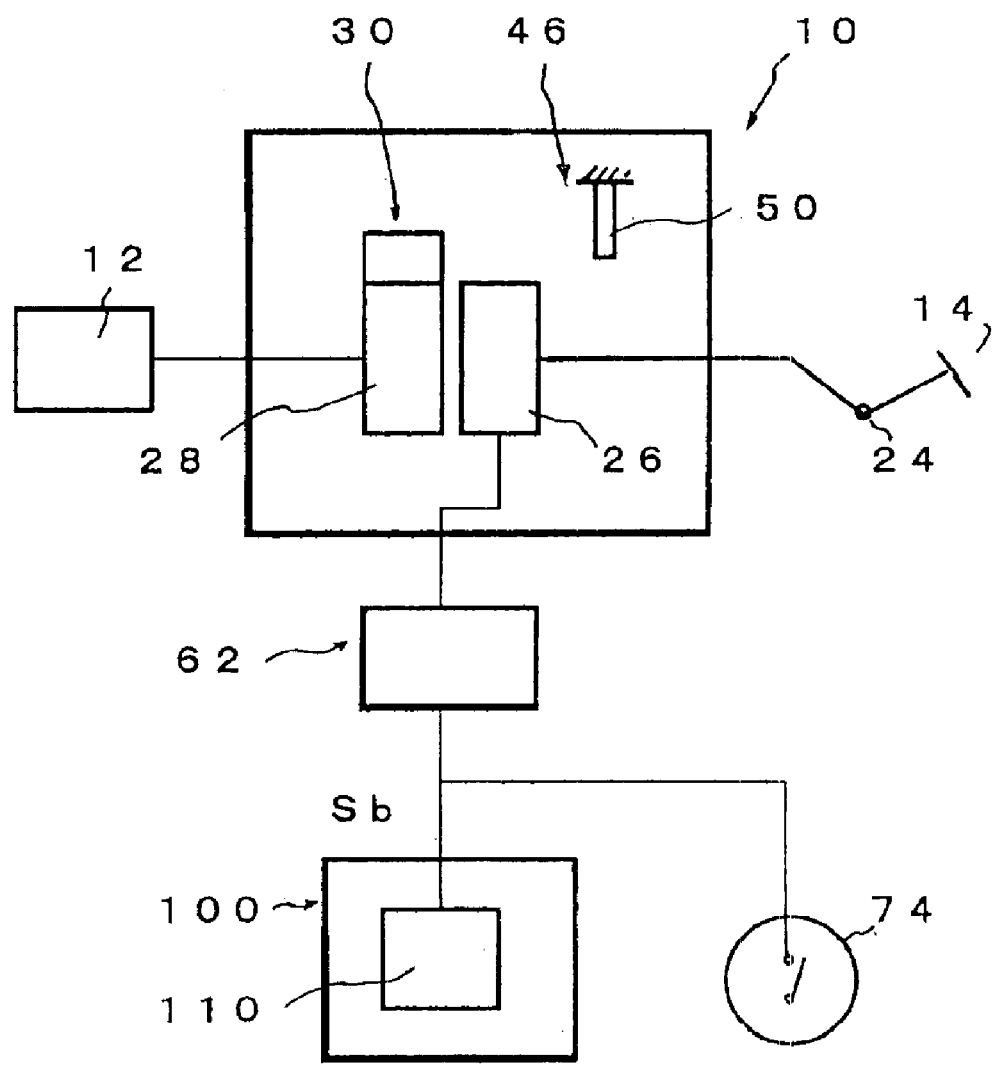
FIG. 1 is a schematic diagram of an accelerator erroneous operation prevention apparatus equipped with a normal travel security apparatus constructed in accordance with the invention.

Describing modes of embodiment of the invention in details, a schematic system of a normal travel security apparatus of an automobile equipped with an accelerator erroneous operation prevention apparatus according to the invention is shown in FIG. 1. The accelerator erroneous operation prevention apparatus 10 comprises an accelerator interlocking member 26 interlocking with an accelerator pedal 14 of the automobile and an acceleration function follow-up member 28 associated with speed adjustment means 12 such as a throttle valve of a gasoline automobile or a speed variable signal generator of an electric car. The accelerator erroneous operation prevention apparatus 10 is equipped with magnetic coupling means 30 to magnetically couple these members 26 and 28 with each other in a normal state and coupling release means 46 to release the magnetic coupling of the accelerator interlocking member 26 and the acceleration function follow-up member 28 when the accelerator pedal 14 is erroneously pushed down in place of a brake pedal.

The accelerator erroneous operation prevention apparatus 10 further comprises lock means to lock the function of the coupling release means 46 by mechanically coupling the accelerator interlocking member 26 and the acceleration function follow-up member 28. This lock means 62 may be of any form (construction) and located at any position so long as the accelerator interlocking member 26 and the acceleration function follow-up member 28 are substantially connected with each other so as to get a state of mechanical disability of the accelerator erroneous operation prevention apparatus 10.

A mode of concrete embodiment of the accelerator erroneous operation prevention apparatus 10 applied to the gasoline automobile is shown in FIGS. 2 through 6. The accelerator erroneous operation prevention apparatus 10 is identical to those disclosed in WO95/31349 and U.S. Pat. No. 5,797,467 and an outline thereof will be described just below.

Figure 2:
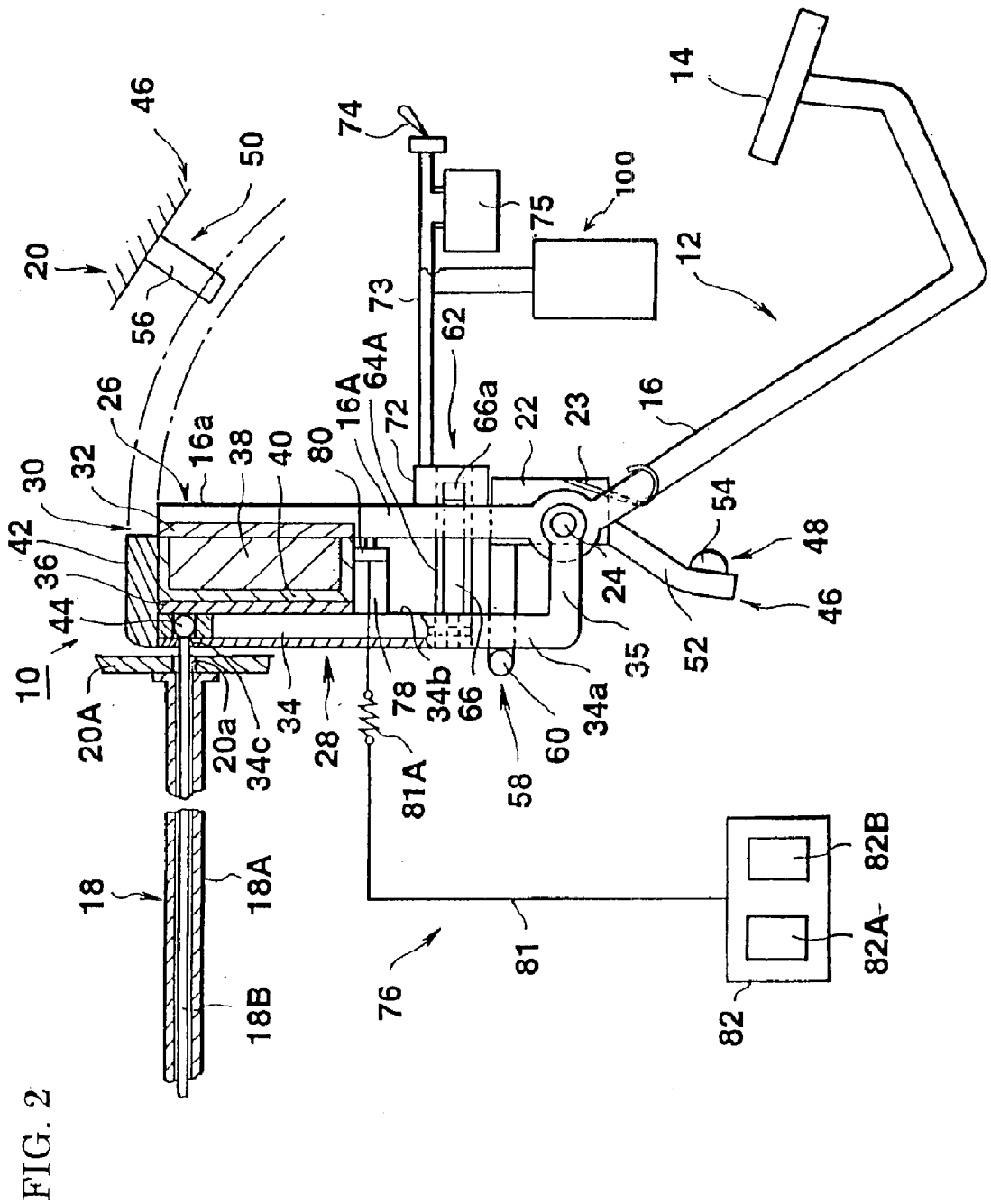
FIG. 2 is a side elevational view of the accelerator erroneous operation prevention apparatus to which the apparatus of the invention is applied with a portion of the latter apparatus shown in cross section.
Figure 3:
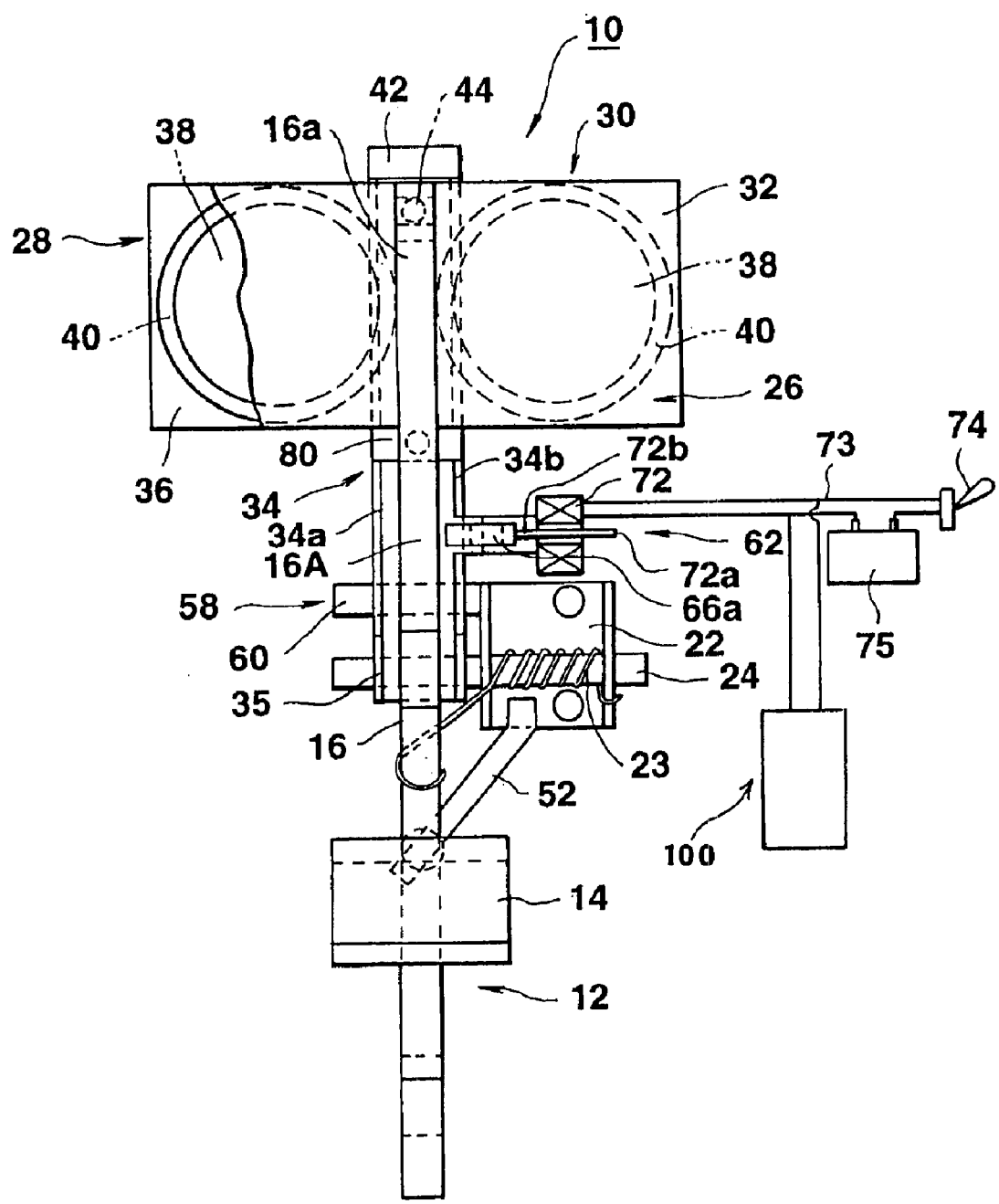
FIG. 3 is a front view of the apparatus of FIG. 1.
Figure 4:
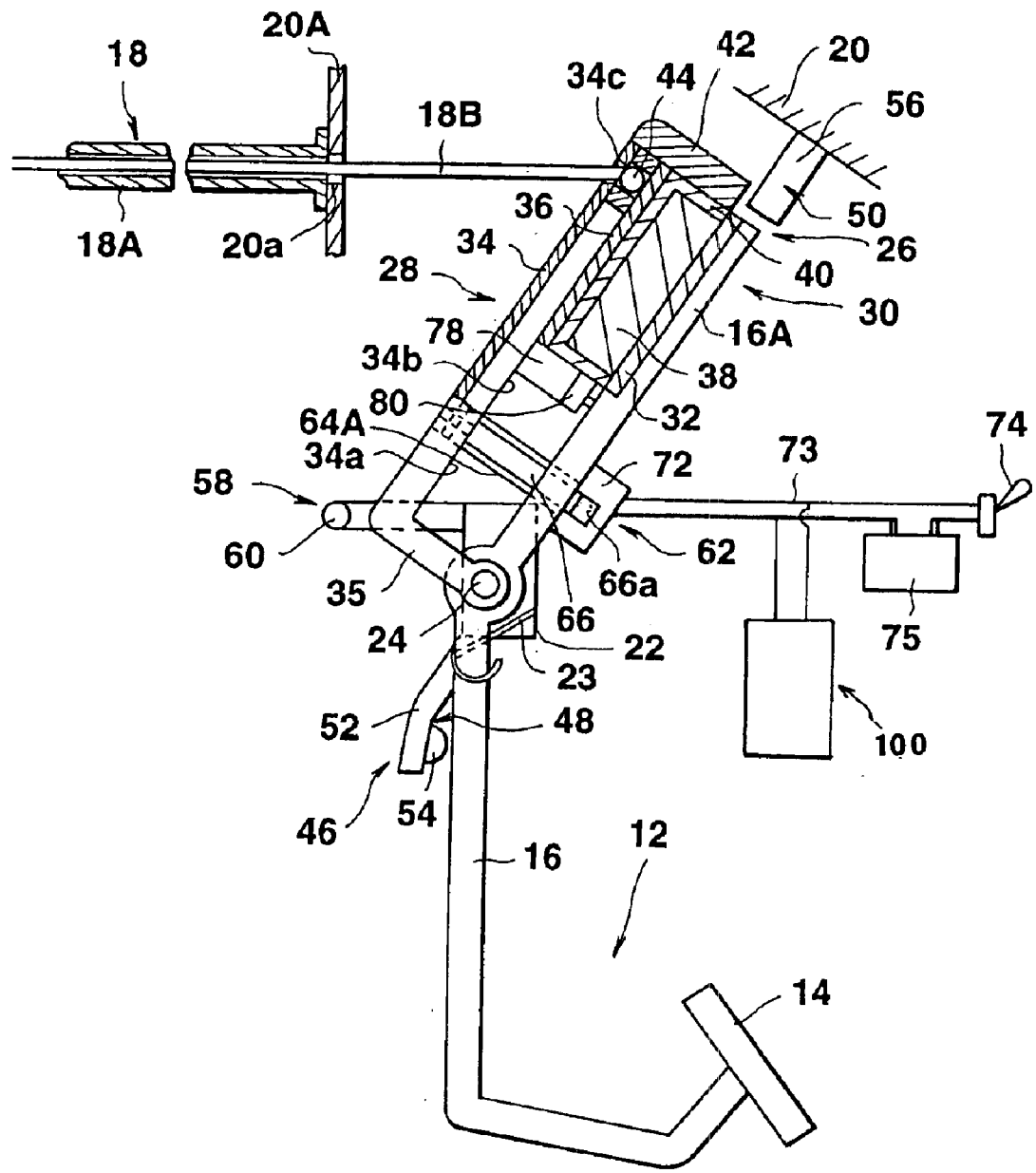
FIG. 4 is a side elevational view of the apparatus of FIG. 1 with a portion thereof shown in cross section in a manner similar to FIG. 1, but shown to be at the maximum pedaling position of the normal operation of the accelerator in the apparatus of FIG. 1.

The accelerator interlocking member 26 may comprise an attraction plate 32 of magnetic material such as iron or the like attached by welding or the like to a free end 16a of an upper half portion 16A of an accelerator arm in the form of lever on the back face thereof (a left-hand face of FIG. 1) so as to extend while crossing the accelerator arm 16. An accelerator pedal 14 is attached to the accelerator arm 16. Thus, in this form, the upper half portion 16A becomes a part of the accelerator interlocking member 16. In FIGS. 2 and 3, a reference numeral 23 designates a return spring provided between a base body 22 and the accelerator arm 16 while wound on a support shaft 24 to work so as to return the accelerator arm 16 in a direction opposite to an acceleration direction.

The acceleration function follow-up member 28 (a throttle interlocking member in the gasoline car) is connected to a leading end of a cable body 18B within an outer case 18A o and f a throttle cable 18, which serves to open and close a not shown throttle valve and comprises a cable holder 34 of channel steel having a length corresponding to the length of the upper half portion 16A of the accelerator arm 16 and at its lower horizontal extension portion 35 pivotally supported by the support shaft 24 together with the accelerator arm 16, a magnet mounting plate 36 disposed between and secured to a pair of raising walls 34a and 34b of the cable holder 34 by means of welding or the like so as to be faced to the attraction plate 32 and two permanent magnets 38 secured to the magnet mounting plate 36. The permanent magnets 38 have a magnetic cover 40 of iron adapted to cover the faces of the permanent magnets 38 excluding the face corresponding to the attraction plate 32. The two permanent magnets 38 may be disposed symmetrically on both sides of the accelerator arm 16 relative thereto, respectively.

Figure 7:
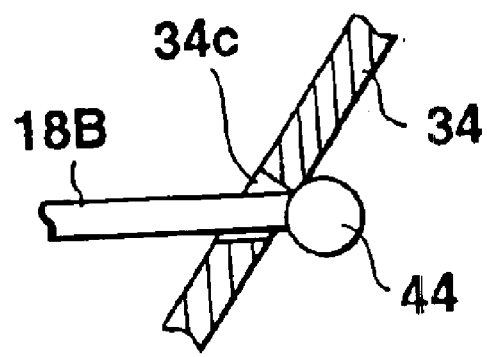
FIG. 7 is an enlarged cross sectional view of an extension hole in a cable holder of FIG. 4 through which a throttle cable extends.

As shown in FIG. 2, the cable body 18B of the throttle cable 18 extends through an extension hole 20a in the wall 20A of the car body 20 and an extension hole 34c in the cable holder 34. A spherical body holder 44 is securely connected to the front end (the right-hand end of FIG. 2) of the cable body 18B and engaged with the cable holder 34 so that the cable body 18B is not drawn out of the cable holder 34. As shown in FIG. 7, the extension hole 34c is so tapered that the inner diameter of the extension hole 34c gets gradually larger toward the inside of the car body (in the leftward direction as viewed in FIG. 2) so that the front end of the cable body 18B is never bent when the magnetic coupling means 30 is pivotally moved about the support shaft 24.

The attraction plate 32 of the accelerator interlocking member 26 of the magnetic coupling means 30 is normally magnetically attracted by the permanent magnets 38 of the throttle interlocking member 28 as shown in FIG. 2 to integrally couple the accelerator interlocking member 26 with the acceleration function follow-up member 28. Thus, as the accelerator pedal 14 is pushed down or pedaled, the accelerator interlocking member 26 and the acceleration function follow-up member 28 of the magnetic coupling means 30 are pivotally moved through the accelerator arm 16 about the support shaft 24 in a clockwise direction as viewed in FIG. 4. Therefore, the cable body 18B of the throttle cable 18 connected to the acceleration function follow-up member 28 is pulled so that the throttle valve is opened in accordance with the pedaling degree of the accelerator pedal 14 to thereby accelerate the engine.

Figure 6:
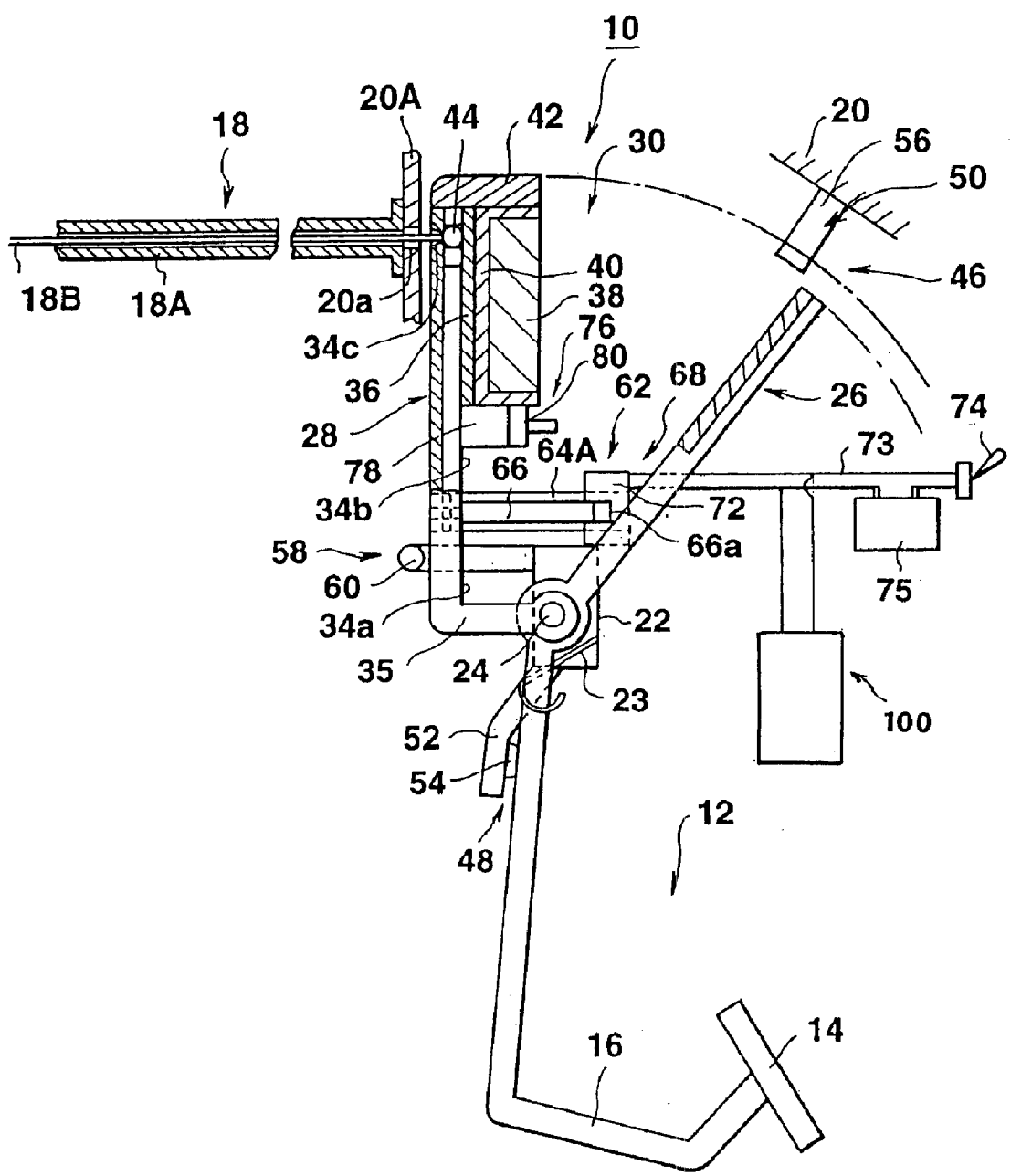
FIG. 6 is a side elevational view of the apparatus of FIG. 1 with a portion thereof shown in cross section in a manner similar to FIG. 1, but shown to be in the state where the accelerator interlocking member is moved in association with the accelerator pedal while the acceleration function follow-up member remains generally at the original position because the accelerator pedal of the accelerator system equipped with the apparatus of FIG. 1 is quickly pushed down erroneously in place of the brake pedal.

The magnetic coupling means 30 is so magnetically set that the accelerator interlocking member 26 is released from the acceleration function follow-up member 28 as soon as a pedaling force equal to or more than a pedaling force applied to a brake pedal is quickly applied to the accelerator pedal 14. This causes the accelerator arm 16 and the accelerator interlocking member 26 to be pivotally moved while the acceleration function follow-up member (the throttle interlocking member) 28 is left at the original position adjacent to the wall 20A of the car body 20 (the position corresponding to the position of the acceleration function follow-up member (the throttle interlocking member) 28 when the accelerator pedal 14 is not pushed down) as shown in FIG. 6 in accordance with an urging force applied to the throttle cable 18 in a leftward direction as viewed in FIG. 2, a mass of the whole throttle interlocking member (the throttle interlocking member) 28, a leverage of the accelerator arm 16 and a set magnetic force of the permanent magnets 38 before the accelerator interlocking member 26 and the acceleration function follow-up member 28 coupled with each other by magnetic attraction of the permanent magnets 38 are moved together with each other by the accelerator arm 16.

The coupling release means 46 serves to stop the movement of the acceleration function follow-up member 28 at the accelerator pedaling position where the accelerator interlocking member 26 exceeds the furthermost pedaling position of the normal accelerating operation so that only the accelerator interlocking member 26 further moves to release the accelerator interlocking member 26 from being magnetically coupled with the acceleration function follow-up member 28.

Firstly, this coupling release means 46 can be accomplished by the leverage function of the accelerator arm 16 as aforementioned. This leverage function moves the attraction plate 32 so that the latter removes out of the permanent magnets 38 sequentially from the upper side portion of the permanent magnets 38. Thus, when the accelerator arm 16 is abruptly pivotally moved due to the erroneous operation of the accelerator pedal, but not slowly moved by means of the normal operation of the accelerator, the accelerator arm 16 having the attraction plate 32 held can easily move while the permanent magnets 38 is left at the original position whereby the magnetic coupling of the accelerator interlocking member 26 and the acceleration follow-up member (the throttle interlocking member) 28 is released.

Secondly, this coupling release means 46 may comprise a first stop member 48 to stop further pushing down of the accelerator pedal in the normal accelerating operation so as to set the furthermost pedaling stroke and a second stop member 50 to be engaged against an engaging member 42 of the acceleration follow-up member 28 so that the acceleration follow-up member 28 is released from being magnetically coupled with the accelerator interlocking member 26 without any further movement of the acceleration follow-up member 28 in the acceleration direction while the first stop member 48 is deformed when the accelerator pedal 14 is pushed down beyond the furthermost pedaling stroke of the normal acceleration operation.

Figure 8:
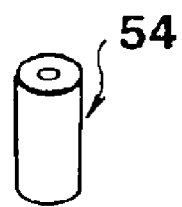
FIG. 8 is a perspective view of a modification of a first stop member used for the accelerator erroneous operation prevention apparatus.

In the illustrated mode of embodiment, as shown in FIGS. 2 and 3, the first stop member 48 may comprise a stationary extension piece 52 downwardly extending from the base 22 so as to face the accelerator arm 16 and a stop body 54 secured to the stationary extension piece 52. The stop body 54 may be formed of resilient material such as hard rubber or the like to be resiliently deformed by pushing down the accelerator pedal 14 beyond the furthermost pedaling stroke of the normal acceleration operation, but may be formed of a body of cylinder or other configuration of plastically deformable material such as hard glass or the like as shown in FIG. 8, for instance, which is plastically deformed to allow the accelerator arm 16 to be moved by pushing down the accelerator pedal 14 beyond the furthermost pedaling stroke of the normal acceleration operation. The cylindrical body may be so disposed that the rear face of the accelerator arm 16 is engaged against the peripheral face of the cylindrical body, but may be preferably so disposed that the accelerator arm 16 is engaged against the longitudinal end face of the cylindrical body.

As shown in FIG. 2, the second stop member 50 may comprise a stop body 56 secured to the car body 20 by any suitable means. The stop body 56 is set at a position where the engaging member 42 of the acceleration function follow-up member 28 never engages the stop body 56 for the pedaling stroke or distance of the normal acceleration operation (see FIG. 4), but the engaging member 42 of the acceleration function follow-up member 28 engages the stop body 56 as the accelerator arm 16 is moved beyond the furthermost pedaling stroke of the normal acceleration operation while the first stop member 48 is deformed (see FIG. 5).

There may be provided position control means 58 to control the position of the acceleration function follow-up member 28 so as not to farther move beyond the position of FIG. 2 in the leftward direction thereof. The position control means 58 may comprise a stop member 60 in the form of rod extending from the base 22 in the rearward direction and then bent so as to engage the rear face of the cable holder 34 of the acceleration function follow-up member 28.

Figure 9:
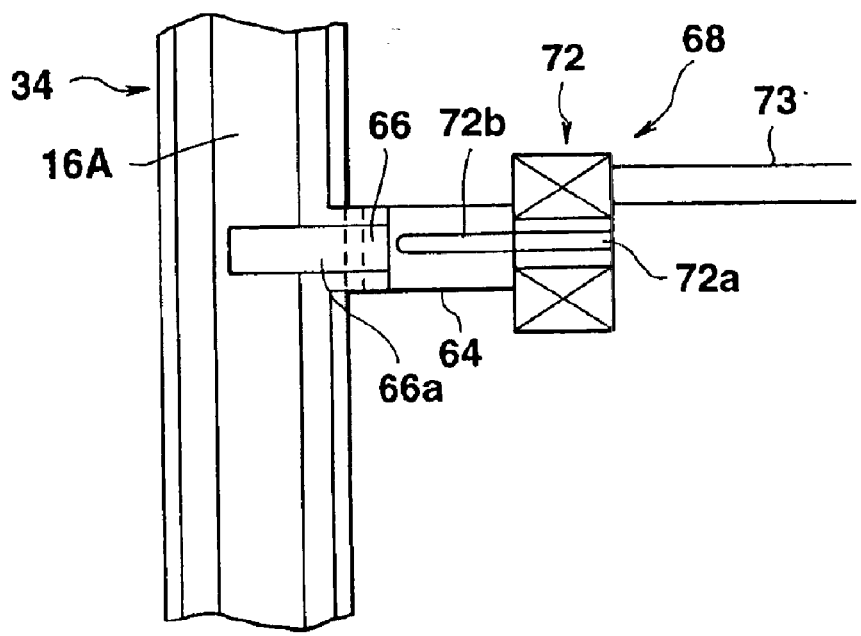
FIG. 9 is an enlarged front view of lock means used for the accelerator erroneous operation prevention apparatus of FIGS. 2 through 6.
Figure 10:
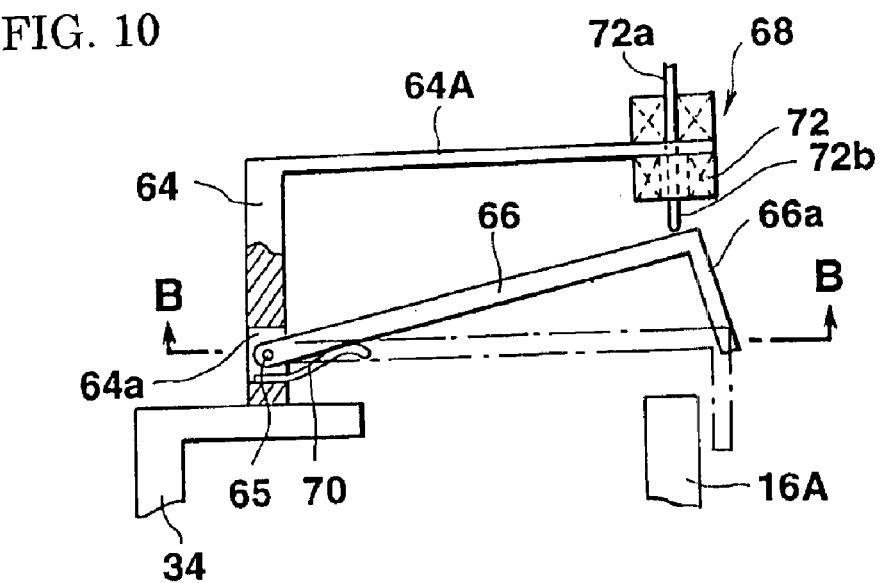
FIG. 10 is a top view of the lock means of FIG. 9 with a portion thereof in horizontal section.
Figure 11:
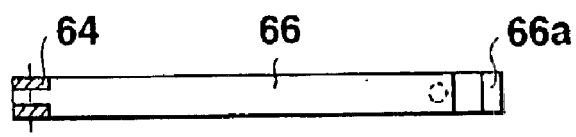
FIG. 11 is a side elevational view of a lock arm taken along a line 11—11 of FIG. 10.

An example of lock means 62 is shown in FIGS. 9 through 11. The lock means 62 may comprise a lock arm 66 pivotally supported by a pin 65 on a bracket 64 mounted on the side of the cable holder 34 at a supporting hole 64a thereof as shown in FIGS. 10 and 11 and having a hook portion 66a provided at a leading end thereof and an actuator 68 to drive the lock arm 66 between a lock position and a lock release position.

The lock arm 66 is mounted on the inner wall face of the support hole 64a in the bracket 64 and held by a spring 70 engaging the inner face of the lock arm 66 at the position where the lock means is released from the locking position (see a solid line of FIG. 10). The actuator 68 may comprise a pushing type linear solenoid 72 mounted on an extension 64A extending from the bracket 64 as shown in FIG. 10 with a pushing rod 72b integrally provided on an armature 72a thereof engaging a free end of the lock arm 66.

Thus, the lock arm 66 is normally at the lock release position by the spring 70, and therefore the accelerator erroneous operation prevention apparatus 10 can prevent the accelerator from being erroneously operated as described in details later, but when the linear solenoid 72 is energized, the armature 72a is magnetically attracted in the downward direction as viewed in FIG. 10 so that the pushing rod 72b pushes the lock arm 66 against the spring 70 with the leading hook portion 66a of the lock arm 66 hooked onto the accelerator arm 16 as indicated by a dotted line of FIG. 10. Thus, the accelerator interlocking member 26 and the acceleration function follow-up member (the throttle interlocking member) 28 of the magnetic coupling means 30 are never released from their magnetic coupling condition so that the accelerator arm 16 is just likely integral with the throttle cable 18.

The illustrated lock means 62 is just by way of an example and it may be in the form in which the lock means is operated (gets the lock state) when the solenoid is deenergized in order to reduce the consumption of the electric power, for example and the position where the coupling is to be locked and the construction of the lock means may be arbitrarily selected.

Figure 5:
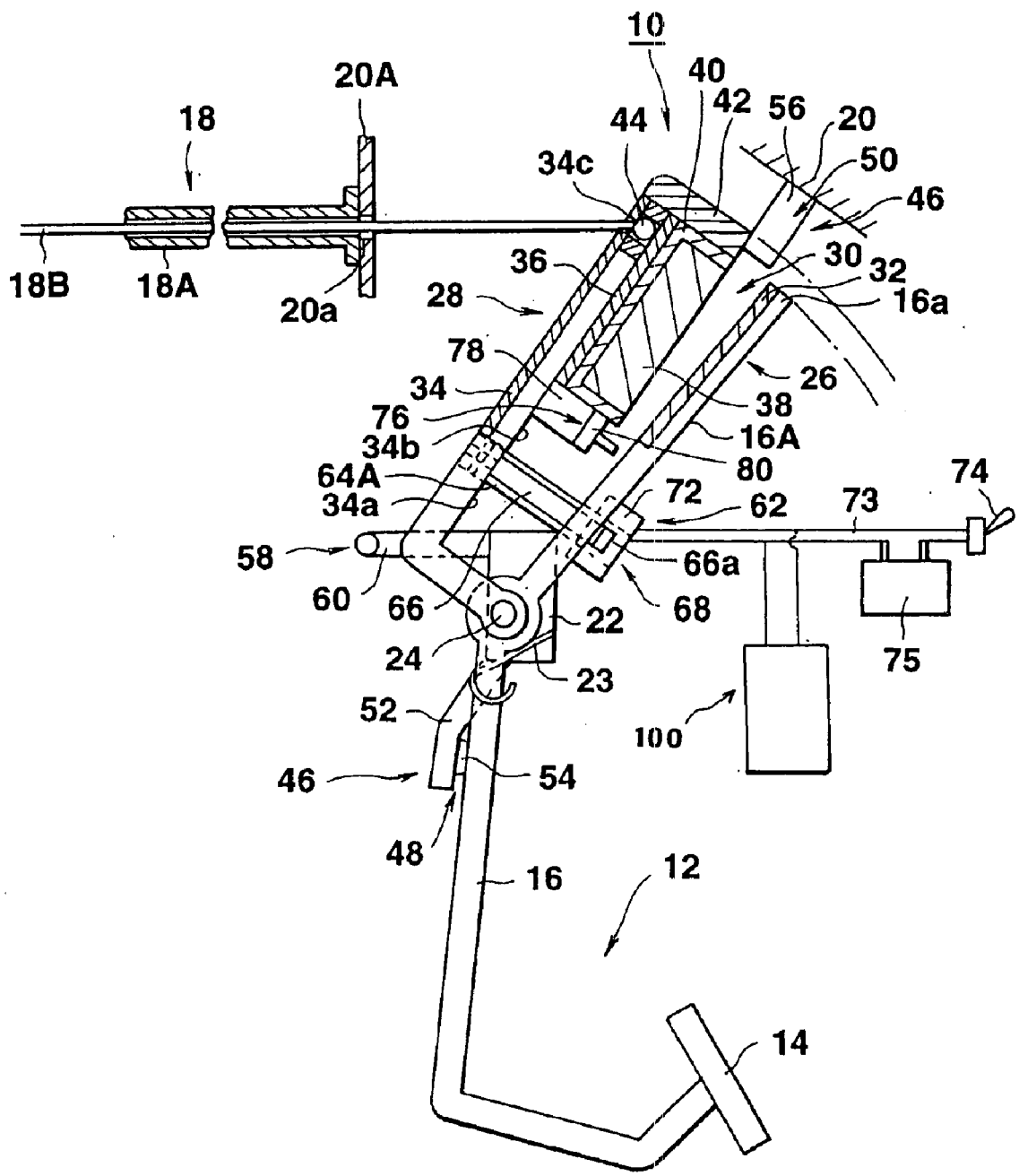
FIG. 5 is a side elevational view of the apparatus of FIG. 1 with a portion thereof shown in cross section in a manner similar to FIG. 1, but shown to be in the state where the magnetic coupling means is released beyond the maximum pedaling position of the normal operation of the accelerator in the apparatus of FIG. 1.

The accelerator erroneous operation prevention apparatus 10 may further comprise erroneous operation warning means 76 to warn to a driver that the accelerator is erroneously operated. As shown in FIG. 2, this erroneous operation warning means 76 may comprise a switch element 80 held on a support 78 which is in turn secured by welding or the like to the raising walls 34a and 34b of the cable holder 34 of the acceleration function follow-up member 28 so as to face the rear face of the upper half portion 16A of the accelerator arm 16 and a warning circuit 82 connected through a lead wire 81 to the switch element 80 and to be driven thereby. As the accelerator erroneous operation prevention apparatus works, the switch element 80 moves far away from the rear face of the upper half portion 16A of the accelerator arm 16 as shown in FIG. 5 whereby the warning circuit 82 is operated.

The warning circuit 82 may preferably include a speech synthesis system 82B issuing a speech of "Please release the foot from the pedal. Please release the foot from the pedal. (repeated)" or "You mistakenly push down the accelerator pedal, but not the brake pedal. Please release the foot from the pedal. Please release the foot from the pedal. (repeated) If you release the foot, the pedal will be returned to the original position.", for example as well as a warning device 82A such as a buzzer or the like. There may be provided a lead wire elastic portion 81A at a portion of the lead wire 81 to allow the lead wire 81 to be expanded and contracted when the acceleration function follow-up member 28 together with the switch element 80 is pivotally moved about the support shaft 24.

The normal travel security apparatus 100 of the invention comprises lock actuation means 110 to hold the lock means in the lock state when the automobile travels at a car speed equal to or higher than a predetermined speed, as shown in FIG. 1.

Figure 12:
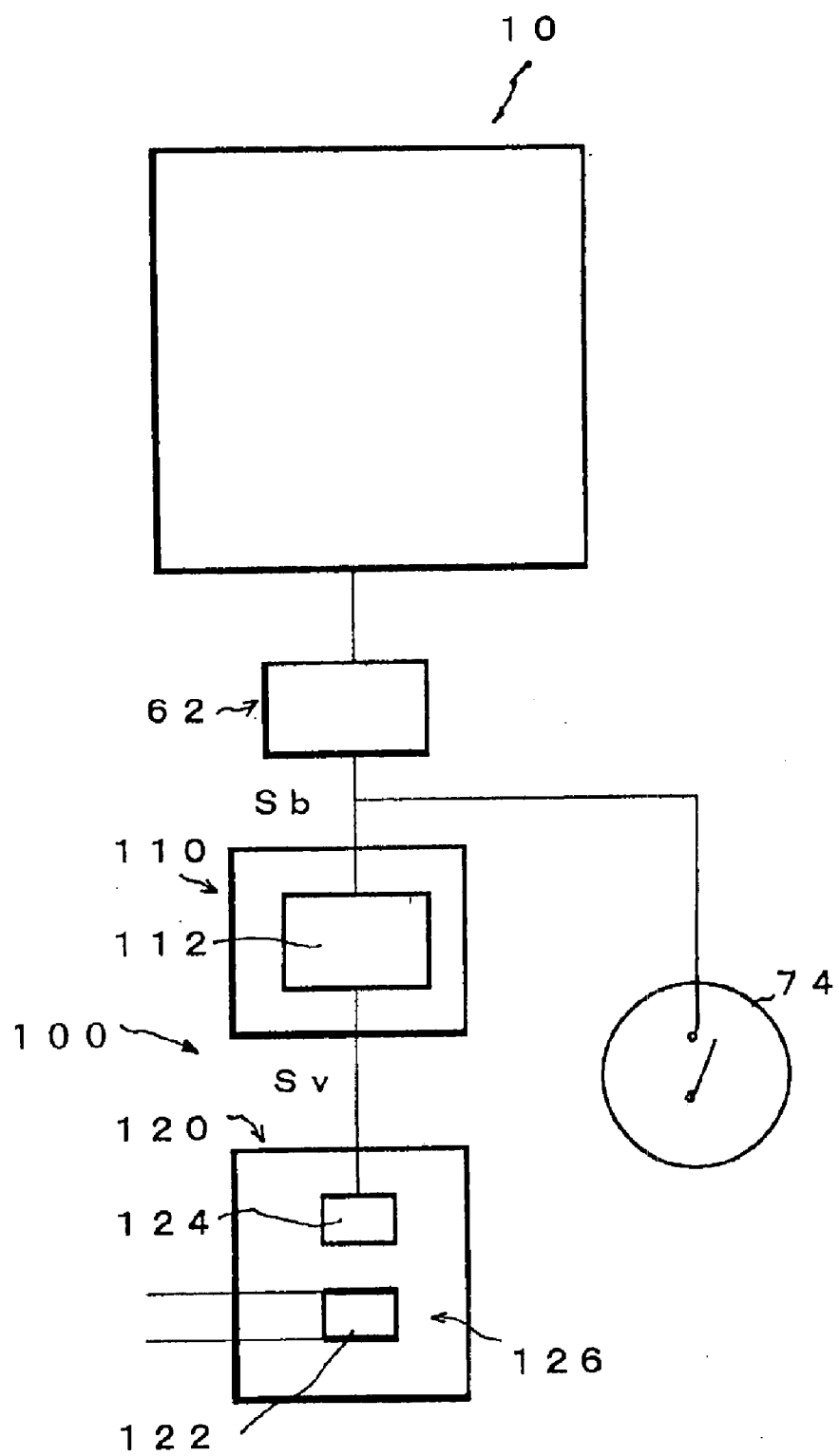
FIG. 12 is a schematic diagram of the normal travel security apparatus constructed in accordance with one mode of embodiment of the invention.

In one mode of embodiment of the invention, the normal travel security apparatus 100 comprises car speed detection means 120 to detect the car speed equal to or higher than the predetermined speed on the normal travel of the automobile for actuating the lock actuator means 110, as shown in FIG. 12.

As shown in FIG. 12, the lock actuator means 110 may comprise a coupling signal generation circuit 112 to generate a coupling signal Sb to energize the solenoid 72 which is an actuator 68 of the lock means 62 to be driven so as to mechanically couple the accelerator interlocking member 26 and the acceleration function follow-up member 28. The coupling signal generation circuit 112 receives the car speed signal Sv from the car speed detection circuit 120 to generate the coupling signal Sb when the car speed signal Sv corresponds to the car speed equal to or higher than the predetermined car speed Va.

As shown in FIG. 12, the car speed detection means 120 may comprise a car speed sensor to measure the car speed V (see FIG. 13) by a combination of a magnet ring 122 rotating in synchronization with the car shaft side of the transmission and a MRE (magnetic resistance element) 124 or other suitable means to output the car speed signal to the lock actuation means 110.

When the automobile is accelerated from the stop state (or the low speed travel state) to reach the predetermined car speed Va, the car speed sensor 126 supplies the car speed signal Sv to the coupling signal generation circuit 112 of the lock actuation means 110 whereby the coupling signal generation circuit 112 generates the coupling signal Sb. The coupling signal is supplied directly or indirectly to the linear solenoid 72 of the lock means 62 to energize the solenoid 72. What is meant by "indirectly" is to energize the solenoid 72 through a switch circuit to be operated so that an energization signal to energize the solenoid 72 is supplied from an electric power source. Once this coupling signal Sb is generated, it never disappears unless the car speed V gets less than the predetermined value Va and therefore the lock state of the lock means 62 continues.

Figure 13:
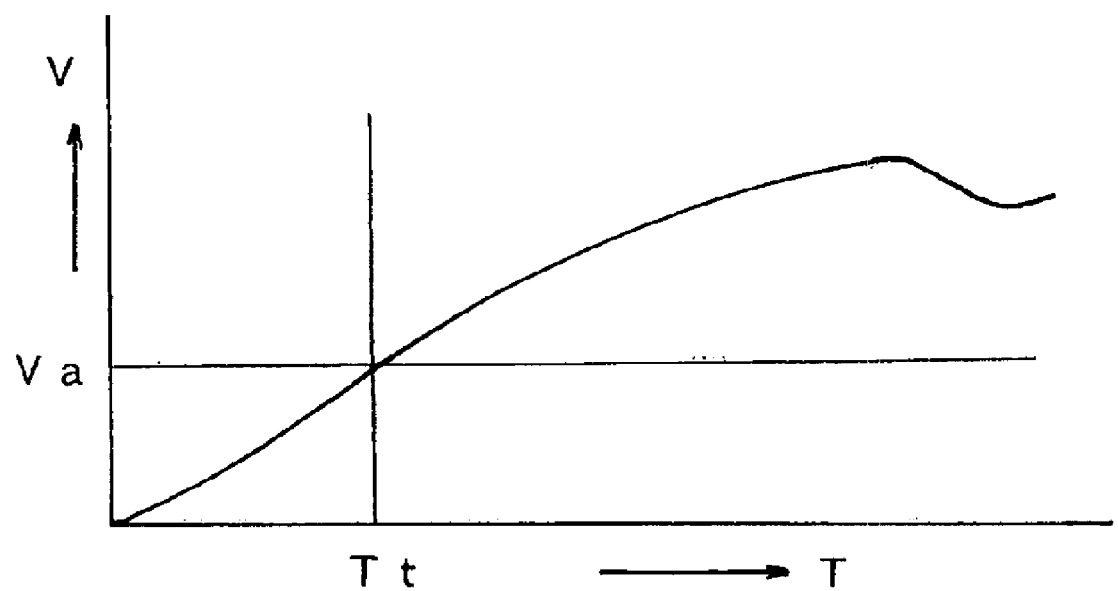
FIG. 13 is a diagram showing the relationship between a car speed V and a travel time T for illustrating the operation of the apparatus of FIG. 12.

The predetermined car speed Va of FIG. 13 may be set at a value at which the automobile is accelerated from the stop state to enter the normal travel state exceeding a going-slowly operation such as 10 to 20 km/h, for example and set at the value of 20 km/h as an example. In the state where the automobile is driven at the car speed exceeding this predetermined car speed Va, the driver drives the automobile while intentionally adjusting the pedaling condition of the accelerator while the foot is contacting the accelerator pedal and therefore will never drive the automobile with the accelerator pedal erroneously pushed down instead of the brake pedal. When the driver understands the state where the automobile should slow down like in the case where a car traveling in front of the driver's automobile slows down by pushing down the brake pedal or the driver's automobile comes near a curve, the driver will change the pedaling from the accelerator pedal to the brake pedal with the usual manipulation feeling and will return the driving state to the original one when the driver judges that the state where it should slow down is dissolved.

Thus, in the case where the car travels at the car speed equal to or less than 20 km/h or is stopping, the lock actuation means 110 never locks the lock means 62 with the result that the accelerator erroneous operation prevention apparatus is in the operable state. Therefore, when the driver strongly pushes down the accelerator pedal erroneously instead of the brake pedal when the driver feels the state of emergency where the car should stop immediately in the case where the car is stopping or travels at the relatively low car speed such as a going-slow speed, the coupling of the accelerator interlocking member 26 and the acceleration function follow-up member (the throttle interlocking member) 28 is released so that the car is never accelerated, which is described already.

Describing the state of the operation of the automobile equipped with the normal travel security apparatus of the invention, in the case where the automobile is stopping or travels in the nearly stopping state, the accelerator arm 16 is connected to the throttle cable 18 through the magnetic coupling means 30. Therefore, when the automobile is accelerated with the normal acceleration operation, the throttle cable 18 is drawn out from the state of FIG. 2 toward the state of FIG. 4 whereby the throttle valve is opened to increase the rotational speed of the engine and the travel speed of the automobile. Even though the accelerator pedal 14 is pushed down to the maximum pedaling stroke, the accelerator arm 16 is only engaged against the first stop member 48 of the stop means 16 and never further moves beyond the stop position. In this manner, even though the accelerator erroneous operation prevention apparatus is in the operable state, the rotational speed of the engine and the car speed can be increased with the normal accelerator manipulation.

On the other hand, when the accelerator pedal 14 is abruptly pushed down with the pedaling force equal to or higher than the force applied to the brake pedal erroneously with the intention to apply the brake pedal from the state where the automobile is stopping or is nearly stopping, the magnetic coupling means 30 is released by means of either of the two release methods of the coupling release means 46 as described already.

More particularly, when the accelerator pedal 14 is erroneously operated with the pedaling force equal to or higher than the force applied to the brake pedal or with a shock power, the attraction plate 32 is moved so that it is sequentially separated from the upper portion of the permanent magnets 38 by the urging force applied to the throttle cable 18 in the leftward direction of FIG. 2, the mass of the whole acceleration function follow-up member (throttle interlocking member) 28, the inertia moment by the set magnetic force of the permanent magnets 38 and the leverage of the accelerator arm 16 and therefore the accelerator arm 16 having the attraction plate 32 held thereon is moved while the permanent magnets 38 are left so that the magnetic coupling state of the accelerator interlocking member 26 and the acceleration function follow-up member (the throttle interlocking member) 28 is released.

Even if the magnetic coupling of the accelerator interlocking member 26 and the acceleration function follow-up member (the throttle interlocking member) 28 is not released, since the accelerator arm 16 provided on the side of the accelerator interlocking member 26 deforms the resilient stop member 54 of the first stop member 48, the attraction plate 32 of the accelerator interlocking member 26 moves beyond the second stop member 50 while the engaging member 42 of the acceleration function follow-up member (the throttle interlocking member) 28 is engaged against the second stop member 56 so as not to move beyond the second stop member and therefore the magnetic coupling of the accelerator interlocking member 26 and the acceleration function follow-up member (the throttle interlocking member) 28 is released.

In the case where the magnetic coupling means 30 is released by the leverage of the accelerator arm 16 and the inertia moment, the acceleration function follow-up member 28 hardly moves in the acceleration direction and therefore the automobile is never accelerated even though the accelerator pedal continues to be pushed. In the case where the magnetic coupling means 30 is released by the stop means 46, the acceleration function follow-up member 28 is returned to the deceleration position by the urging force normally applied to the acceleration function follow-up member 28 in the deceleration direction and therefore the automobile is never accelerated similarly. In this manner, the accelerator erroneous operation can be effectively prevented.

In any case, when the magnetic coupling means 30 is released, the switch element 80 of the erroneous operation warning means 76 is closed by moving far away from the accelerator arm 16 and therefore the warning circuit 82 is energized so that the buzzer is driven or the speech of "Please release the foot from the pedal" or the like is uttered. Thus, the driver can recognize the erroneous operation of the accelerator. Therefore, the driver can switch from the accelerator pedal to the brake pedal immediately to decelerate or stop the vehicle.

As the driver recognizes the erroneous operation of the accelerator and releases the foot from the accelerator pedal 14, the accelerator arm 16 is moved by the coil spring 23 so as to again couple the accelerator interlocking member 26 of the magnetic coupling means 30 with the acceleration function follow-up member 28 thereof, as shown in FIG. 2. In this manner, since only releasing the foot from the accelerator pedal 14 causes the magnetic coupling means 30 to be returned to the original condition, the accelerator can be again normally operated and the accelerator erroneous operation prevention apparatus 10 gets the state where it normally works in the stopping state or the low speed travel state, which is the nearly stopping state.

On the other hand, as the car travels at the car speed exceeding the predetermined car speed Va such as the going-slow speed, for example, by the normal operation in which the car is gradually accelerated from the stopping state as shown in FIG. 13, the coupling signal generation circuit 112 of the lock actuator means 110 generates the coupling signal Sb when the car speed exceeds Va (at the time of Tt in the illustrated embodiment) and the lock actuation means 110 is operated so as to lock the lock means 62. Thus, as already described, the coupling release means 46 is locked so that the lock arm 66 is hooked to the upper half portion 16A of the accelerator arm 16 whereby the coupling of the accelerator interlocking member 26 and the acceleration function follow-up member (the throttle interlocking member) 28 of the magnetic coupling means 30 is never released.

In this manner, as the car enters the normal travel state in which the car travels at the car speed V exceeding the predetermined car speed Va, the car gets the same state as the one in which the accelerator erroneous operation prevention apparatus is not provided as if the accelerator pedal 14 and the throttle cable 18 are integrally provided. This means that the accelerator erroneous operation prevention apparatus does not work in the case where the car passes another or other cars during the normal travel or uphill-travel. When the driver goes into the opposite side lane for trying the overtaking operation and confirms that the opposite side car runs toward the driver's car, the driver sometimes pushes down more strongly in order to more quickly perform the overtaking operation. This also happens in the case of passing during the uphill-travel. In these cases, the coupling of the accelerator interlocking member 26 and the acceleration function follow-up member 28 of the magnetic coupling means 30 should be avoided from being released. Since the lock actuator means 110 locks the lock means 62, the coupling of the accelerator interlocking member 26 and the acceleration function follow-up member 28 of the magnetic coupling means 30 is never released. Thus, the normal overtaking operation and the uphill-travel overtaking operation can be safely made.

The driver's pushing down the accelerator pedal erroneously instead of the brake pedal happens in the case where the driver gets a panic state such as the case where it is noticed that the car moves backward erroneously in spite of intending to move forward without noticing that the transmission of the automatic gearbox is in the reverse position, the case reverse to the former case, the case where although the car is stopping, the driver has an illusion that its car moves with nature because the adjacent parking car moves or the case where a person or another car crosses suddenly in front of the going-slowly car. This happens when the car is stopping or travels at the car speed equal to or less than the going-slowly speed at which it travels at the nearly stopping speed, but not when the automobile is in the normal travel state in which it is accelerated by the normal operation. Thus, the car speed V suitable for getting the lock operation state of the lock means 62 by activating the lock actuator means 110 is the normal travel car speed at which the driver never gets the panic state, namely the car speed equal to or more than the predetermined speed such as the going-slowly speed. Although, in the illustrated mode of embodiment, the predetermined speed Va is 20 km/h, it may be practically 10 km/h, for example or may be a higher value such as 25 km/h, for example. In brief, this is a speed at which the driver possibly gets the panic state during the low speed travel and therefore this speed Va is not necessarily limited to the aforementioned speed of 10 to 20 km/h.

As shown in FIGS. 1 and 12, a manual switch 74 may be provided in parallel to the coupling signal generation circuit 112 of the normal travel security apparatus 100 of the invention. Thus, the accelerator erroneous operation prevention apparatus can be prevented from working in the stopping state or the nearly stopping state by manually closing the manual switch 74 as well.

Figure 14:
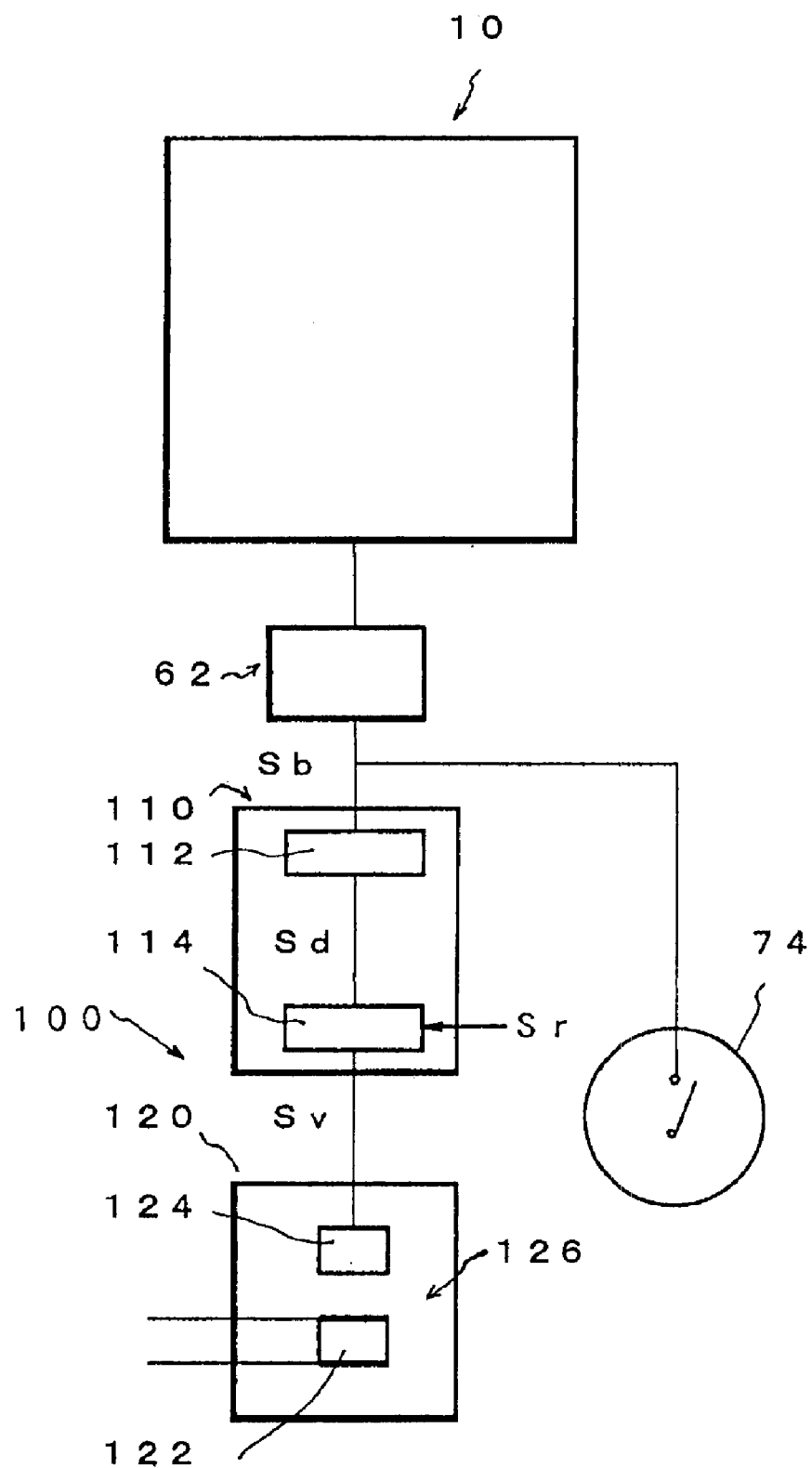
FIG. 14 is a schematic diagram of the normal travel security apparatus constructed in accordance with another preferred mode of embodiment of the invention.

The normal travel security apparatus according to a further preferred mode of embodiment of the invention is shown in FIG. 14. In the normal travel security apparatus according to this mode of embodiment, the lock actuator means 110 includes a timer switch 114 provided in front of the coupling signal generation circuit 112. The timer switch 114 starts a counting operation when it receives the car speed signal Vs corresponding to the predetermined car speed Va from the car speed detection means 120 and supplies an actuation signal Sd to the actuation signal generation circuit 112 when the predetermined number is counted (when the predetermined time limit passes). The signal generation circuit 112 receives the actuation signal Sd to generate the coupling signal Sb to be supplied to the lock actuation means 110. The car speed detection means 120 may be identical to the one used in the mode of embodiment of FIG. 12.

The predetermined car speed Va may be set in the same manner as in the preceding mode of embodiment while the predetermined time limit Td may be set at a value for judging whether pushing down the accelerator pedal is made by the erroneous operation or by the normal travel and this will be described with reference to FIG. 15.

As shown in FIG. 15(A), in the case where the pedaling of the accelerator pedal 14 is made on the normal travel when the car departs from the stopping state, for example, the car speed V rising as time elapses increases along a loose curve such as a normal travel curve Ta or Tb of FIG. 15(A). If the pedaling of the accelerator pedal 14 is made by the erroneous operation while mistaken for the pedaling of the brake pedal, the car speed V increases in a short time along an imaginary travel curve Tx of FIG. 15(A). The imaginary travel curve Tx is one imaginarily showing the state where the car speed V increases in the case where the accelerator pedal is pushed down erroneously instead of the brake pedal and the acceleration operation continues. The predetermined car speed Va is set at an appropriate value falling within the range of 10 km/h to 20 km/h, for example as already described, while the predetermined time limit Td is set as an appropriate time value falling within the range of 1 to 10 seconds and preferably of 2 to 5 seconds along the imaginary travel curve by the operation (the operation due to the accelerator erroneous operation) other than the normal operation from the cap speed less than the predetermined car speed Va, but close thereto for allowing the accelerator erroneous operation prevention apparatus to work (in this case, the imaginary travel curve is displaced in the rightward direction relative to the imaginary travel curve Tx of FIG. 15(A)), but these values may differ in accordance with the conditions of the displacement volume of the car, vehicles weight, and others.

As shown in FIG. 15(B), in the case where the automobile is accelerated by pushing down the accelerator pedal 14 on the normal travel from the state where the automobile travels at the car speed less than the predetermined car speed Va, similarly, the car speed V rising as time elapses increases along a loose curve such as a normal travel curve Ta' or Tb' of FIG. 15(B). If the pedaling of the accelerator pedal 14 is made by the erroneous operation while mistaken for the pedaling of the brake pedal, the car speed V increases in a short time along an imaginary travel curve Tx' of FIG. 15(B). The imaginary travel curve Tx' is one imaginarily showing the state where the car speed V increases in the case where the accelerator pedal is pushed down erroneously instead of the brake pedal and the acceleration operation continues in the same manner as the imaginary travel curve Tx of FIG. 15(A). In this case, the predetermined time limit Td' after the car speed reaches the predetermined value Va (an appropriate value falling within the range of 10 km/h to 20 km/h) and until the lock means 62 should be operated is set in the same manner as the time limit Td already described, but since the car speed is closer to the predetermined car speed Va in comparison with the case where the automobile is accelerated from the stopping state, it is set as a shorter time such as 3 to 7 seconds, for example, which is slightly longer than Td.

Thus, in any case, even though the car speed V reaches the imaginary predetermined car speed Va by the driver's pushing down the accelerator pedal 14 instead of the brake pedal, the case where it reaches the predetermined car speed Va on the normal operation can be distinguished from the erroneous operation. Accordingly, in the former case, the automobile is never accelerated by the operation of the accelerator erroneous operation prevention apparatus before the lock means 62 is actuated, which can effectively prevent the accelerator erroneous operation.

On the other hand, in the case where the travel of the automobile starts by the normal operation method from the state where the automobile is stopping or the accelerator pedal is intentionally pushed down by the normal operation method from the state where the automobile travels at the low speed, the lock actuation means 110 is operated after the end of the time limit considering the time during which the accelerator erroneous operation is possibly performed. After the end of the time limit, the accelerator erroneous operation never happens and therefore it is judged from the predetermined car speed Va that the normal acceleration is performed.

In these cases, the coupling signal Sb is generated from the coupling signal generation circuit 112 of the lock actuator means 110 with delay of the predetermined time limit Td after the car speed reaches the predetermined value Va and then the lock actuator means 110 is actuated to operate the lock means 62 so as to mechanically connect the accelerator interlocking member 26 and the acceleration function follow-up member 28 with each other. It is when the automobile is further accelerated to the car speed higher than the predetermined one Va that the lock actuator means 110 is practically actuated and this causes no trouble for the travel by the normal operation.

While the automobile is stopping or runs at the low speed lower than the predetermined value, the lock means 62 is in the lock release state as indicated by the solid line of FIG. 10 and provided between the accelerator interlocking member 26 and the acceleration function follow-up member (the throttle interlocking member) 28 in the state where the accelerator erroneous operation prevention apparatus 10 can work, but the accelerator interlocking member 26 and the acceleration function follow-up member 28 are in the integral state by the magnetic coupling of the permanent magnets 38 and the attraction plate 32.

In this manner, as the normal operation is performed while the automobile is accelerated by intentionally pushing down the accelerator pedal 14 from the stopping state or the travel state at the car speed lower than the predetermined value, the car speed V increases relatively slowly along the normal travel curves Ta and Tb or Ta' or Tb' of FIG. 15 as time T elapses and when the car speed detection means 120 detects the predetermined car speed Va, the car speed signal Sv corresponding to the car speed Va is supplied to the timer switch 114. The timer switch 114 inputs the actuation signal Sd to the coupling signal generation circuit 112 of the lock actuator means 110 after the end of the predetermined time limit Td and the coupling signal generation circuit 112 generates the coupling signal Sb based on this signal to hold the lock state of the lock means 62.

In this manner, when the automobile enters the normal operation state, the lock means 62 bypasses (disables) the magnetic coupling means 30 to mechanically connect the accelerator interlocking member 26 and the acceleration function follow-up member 28 to each other whereby the accelerator erroneous operation prevention apparatus gets the inoperable state. Thus, when the overtaking operation is tried by largely pushing down the accelerator pedal on the highway and so on or when the overtaking operation is tried during the uphill travel, for example, the magnetic coupling of the magnetic coupling means 30 is never released whereby the overtaking operation and the uphill travel can be safely performed.

This coupling signal Sb never disappears unless the car speed V gets lower than the predetermined value Va, which is identical to that in the preceding mode of embodiment. On the other hand, the timer switch 114 is reset when the lock actuator means 110 actuates the lock means 62 by the passage of the time limit Td so that the next acceleration operation of the accelerator 14 is prepared for after the automobile stops or is decelerated to the car speed less than the predetermined value Va.

The timer switch 114 starts to count when the car speed V reaches the predetermined value Va and in the case where the accelerator interlocking member 26 and the acceleration function follow-up member 28 are separated from each other so that the accelerator erroneous operation prevention apparatus works due to the erroneous pedaling of the accelerator pedal 14 while mistaken for the brake pedal after the count starts, a reset signal Sr is applied to the timer switch 114, which is therefore reset. If the timer switch 114 is not reset, the actuation signal Sd is generated after the passage of the time limit because the timer switch continues to count after the accelerator erroneous operation prevention apparatus works and therefore the pushing rod 72*b* integrally provided with the armature 72*a* of the lock means 62 is kept protruded. Thus, when the driver releases the foot from the accelerator pedal 14 or changes the pedaling of the accelerator pedal to the pedaling of the brake pedal by the driver's noticing the accelerator erroneous operation, the accelerator interlocking member 26 and the acceleration function follow-up member 28 cannot be coupled again even though they try to be coupled by the permanent magnets 38 because the pushing rod 72*b* interferes with the magnetic coupling of them. It is because the protrusion of the pushing rod 72*b* is prevented whereby it never interferes with the magnetic coupling of the members 26 and 28 that the timer switch 114 is reset by the reset signal Sr.

Figure 16:
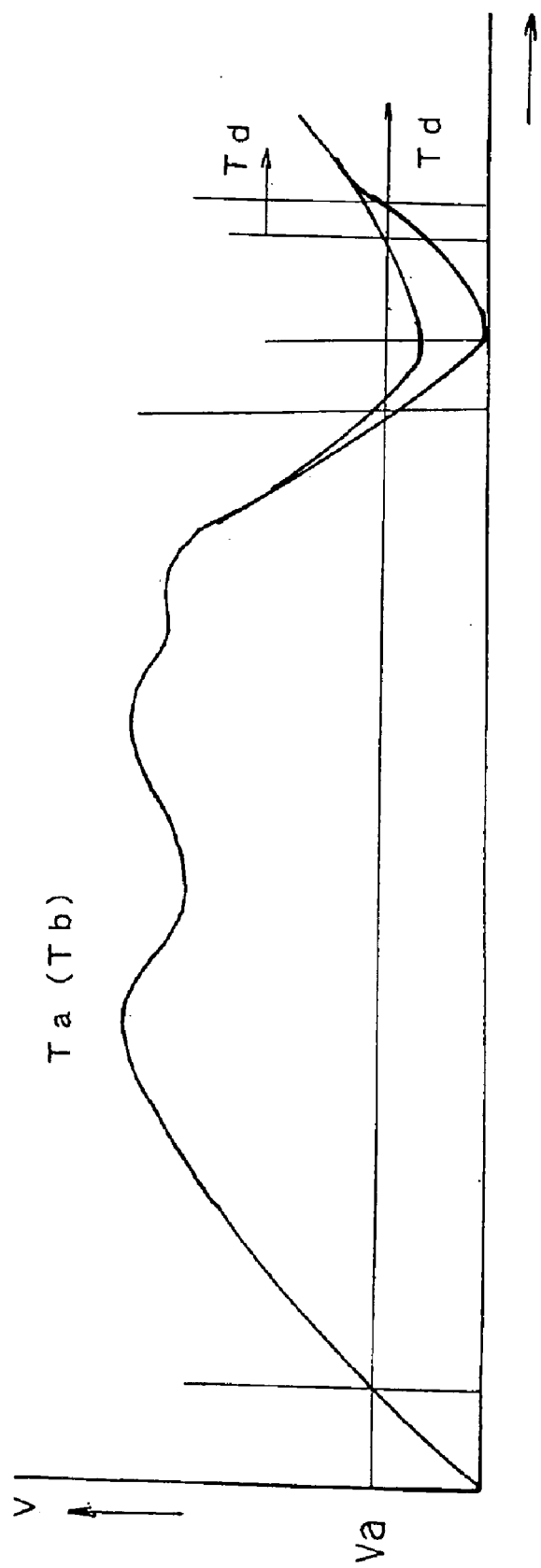
FIG. 16 is identical to FIG. 15, but is a diagram illustrating the state where the normal travel security apparatus of the invention is operated in the case where the automobile travels while changing the car speed.

In this manner, while the automobile is appropriately accelerated or decelerated within the range of the car speed equal to or more than the predetermined value Va in the normal operation state, the automobile travels while the car speed V varies in waveform as shown in FIG. 16. However, if the automobile stops at a crossing which has a traffic light or comes to travel in the nearly stopping state, the automobile is decelerated to the car speed equal to or less than the predetermined value Va and the car speed signal Sv gradually decreases as indicated by a curve portion below the predetermined value Va located in the right side of FIG. 16 until it gets the state of stopping or nearly stopping. As the car speed signal Sv gets less than the predetermined value Va of the car speed, the coupling signal Sb from the coupling signal generation circuit 112 disappears and therefore the linear solenoid 72 of the lock means 62 is deenergized so as to disengage the lock whereby the accelerator erroneous operation prevention apparatus gets the operable state.

Thereafter, as the automobile starts the normal operation and is accelerated, the coupling signal Sb is generated from the coupling signal generation circuit 112 after the predetermined car speed Va is reached and after the time limit Td elapses in the same manner as in the operation of the preceding modes of embodiment and the lock means 62 is actuated to bypass the magnetic coupling means 30 to thereby get the inoperable state of the accelerator erroneous operation prevention apparatus 10.

In the normal travel security apparatus of FIG. 14, when the accelerator erroneous operation prevention apparatus is operated, the lock actuator means 110 is preferably not operated by resetting the timer switch 114 or by alternative means. This is because when the timer switch 114 counts the predetermined time limit Td or Td' after the erroneous operation prevention apparatus works and then the signal generation circuit 112 generates the coupling signal Sb, the lock arm 66 of the lock means 62 gets the lock position as indicated by the dotted line of FIG. 10 (the upper half portion 16A of the accelerator arm 16 is practically not locked because the accelerator arm 16 is displaced in a rightward direction from the position of FIG. 10 before the lock arm 66 gets the lock position) and therefore the upper half portion 16A of the accelerator arm 16 cannot be returned to the solid line of FIG. 10 due to the obstruction of the lock arm 66 even though the driver releases the foot from the accelerator pedal so as to return the accelerator arm 16 to the original position. So long as the lock means 62 is not actuated, such an obstruction never arises.

In the aforementioned mode of embodiment, although the timer switch 114 is used in order that the coupling signal generation circuit 112 of the lock actuation means 110 generates the coupling signal Sb on the passage of the predetermined time limit after the car speed reaches the one Va, the coupling signal generation circuit 112 itself may include a delay circuit for accomplishing the similar object.

Figure 17:
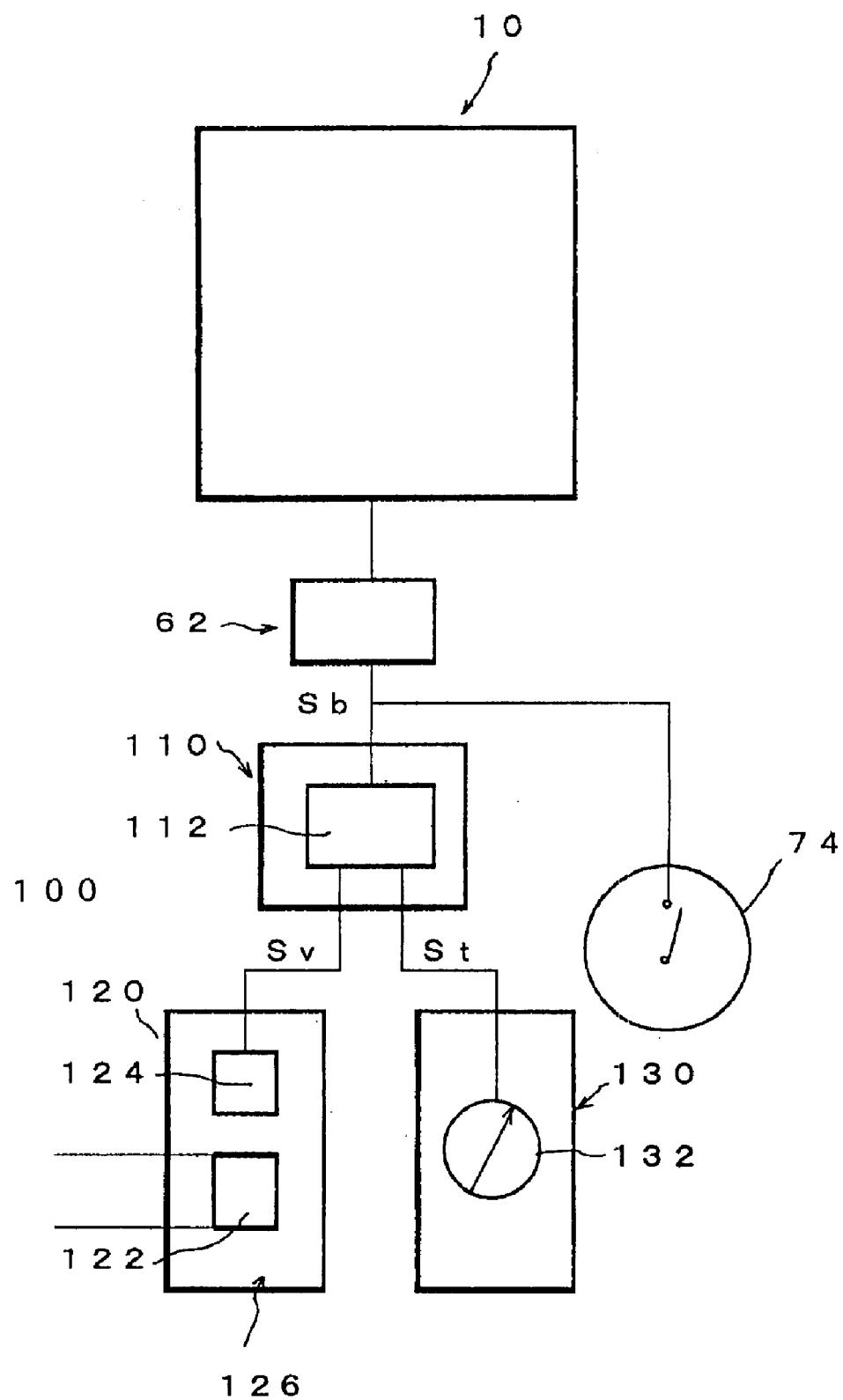
FIG. 17 is a schematic diagram of the normal travel security apparatus constructed in accordance with further preferred mode of embodiment of the invention.

The normal travel security apparatus in accordance with further mode of embodiment of the invention is shown in FIG. 17. This normal travel security apparatus comprises travel time detection means 130 to detect the travel time after the automobile departs from the stopping state or after the accelerator pedal starts to be pedaled in the acceleration direction from the state where the automobile travels at the car speed lower than the predetermined one in addition to the car speed detection means 120 to detect the car speed V of the automobile. The lock actuation means 110 serves to hold the lock state of the lock means 62 when the car speed detection means 120 detects the car speed of value equal to or more than the predetermined value Va and the travel time detection means 130 detects the travel time Tt or Tt' (see FIG. 18). The car speed detection means 120 may be identical to that used in the modes of embodiment of FIGS. 12 and 14.

The travel time Tt which should be detected by the travel time detection means 130 is the time until the car speed reaches the predetermined value Va after the automobile begins to be accelerated from the stop state of the automobile as described later while the travel time Tt' is the time until the car speed reaches the predetermined value Va after the automobile begins to be accelerated from the state where the automobile travels at the car speed less than the predetermined value Va.

The travel time detection means 130 may comprise a timer 132 to output a travel time detection signal St detecting the travel time Tt (see FIG. 18(A)) from the stop state of the automobile after it departs or the travel time Tt' (see FIG. 18(B)) after the accelerator 14 begins to be pedaled in the acceleration direction from the predetermined low speed. This timer 132 is reset (1) when the lock actuation means 110 actuates the lock means 62 to the lock state, (2) when the predetermined time Tt elapses after the acceleration from the stopping state without any detection of the later-described predetermined car speed Va by the car speed detection means 120 or (3) when the travel time Tt' elapses after the accelerator pedal begins to be pedaled in the acceleration from the predetermined low speed (the speed less than the car speed Va) without any detection of the predetermined car speed Va by the car speed detection means 120. Thus, the timer 132 begins to count when the automobile stops thereafter and begins to travel again or when it is accelerated after it is decelerated to the car speed less than the predetermined value Va.

The coupling signal generation circuit 112 of the lock actuator circuit 110 is so constructed as to generate the coupling signal Sb when it receives the car speed signal Sv of value equal to or more than the predetermined car speed Va from the car speed detection means 120 and the travel time detection signal corresponding to the predetermined travel time Tt or Tt' from the travel time detection means 130.

Although the predetermined car speed Va is set in the same manner as in the modes of embodiment of FIGS. 12 and 14, the predetermined travel time Tt or Tt' is set at a value from which whether the pedaling of the accelerator pedal 14 is performed by the erroneous operation or by the normal operation is judged, but this will be described in details with reference to FIG. 18.

FIGS. 18(A) and 18(B) show curves Ta, Tb, Tx and Ta', Tb', Th' similar to those of FIGS. 15(A) and 15(B), respectively. The predetermined travel times Tt and Tt' may be set at an appropriate value falling within 3 to 30 seconds and preferably 5 to 10 seconds, but these will sometimes differ in accordance with the displacement volume of the automobile, the vehicle weight and other conditions.

In the apparatus according to this mode of embodiment, in the case where the automobile starts to travel by the normal operation from the stopping state or the accelerator pedal is pushed down by the normal operation from the state where the automobile travels at the low speed, the coupling signal Sb is generated from the coupling signal generation circuit 112 at the time Tt or Tt' when the predetermined car speed Va and a normal operation discernment boundary L or L' for the normally raising up normal travel curve Tb or Tb' cross each other and the lock actuation means 110 operates the lock means 62 so that the accelerator interlocking member 26 and the acceleration function follow-up member 28 are mechanically connected with each other.

More particularly, as the normal operation is performed while the automobile is accelerated by pushing down the accelerator pedal from the state where it is stopping or travels at the car speed less than the predetermined value, the car speed V relatively slowly rises along the normal travel curves Ta, Tb or Ta', Tb' as time T elapses. For instance, when the time T reaches the time Ty or Tt' at which the car speed V on the normal travel curve Tb or Tb' reaches the value equal to or more than the predetermined value Va, the predetermined car speed signal Sv and the predetermined travel time detection signal St are input to the coupling signal generation circuit 112 of the lock actuator means 110 and as a result, the coupling signal generation circuit 112 generates the coupling signal Sb, which operates the lock means 62.

Accordingly, the accelerator interlocking member 26 and the acceleration function follow-up member 28 are mechanically connected to each other so that the lock means 62 bypasses (disables) the magnetic coupling means 30 whereby the accelerator erroneous operation prevention apparatus gets the inoperable state. Thus, the overtaking operation on the highway and on the uphill can be safely performed.

The coupling signal Sb never disappears unless the car speed V is below the predetermined value Va, which is identical to the mode of embodiment of FIG. 14 described already. The timer 132 of the travel time detection means 130 is reset when the predetermined travel time Tt or Tt' elapses and the lock actuator means 110 actuates the lock means 62 whereby the apparatus is preparatory for the next acceleration operation of the accelerator pedal after the automobile stops or is decelerated to the car speed of less than Va.

As already described, the timer 132 is reset when the predetermined time Tt or Tt' elapses after the acceleration while the car speed signal Sv from the car speed sensor 116 never reaches the predetermined car speed Va as well as when the lock actuator means 110 actuates the lock means 62 to get the lock state. If the timer is not reset, when the accelerator pedal 14 happens to be abruptly pushed down erroneously while mistaken for the brake pedal from the state where the automobile slowly goes at the car speed of less than Va after the acceleration for a long time exceeding the predetermined travel time Tt or Tt', the acceleration by the erroneous operation cannot be distinguished from the acceleration by the normal operation because the travel time already reaches the predetermined value Tt or Tt'. Thus, the lock means 62 is possibly locked in spite of the acceleration by the erroneous operation. As the timer 132 is reset when the car speed does not reach the value Va even though the time Tt or Tt' elapses, the erroneous operation and the normal operation can be positively distinguished from each other.

For the same reason as in the mode of embodiment of FIG. 14, when the erroneous operation prevention apparatus 10 works, the lock actuator means 110 desirably gets the inoperable state by resetting the timer 132 or by any other means.

Figure 19:
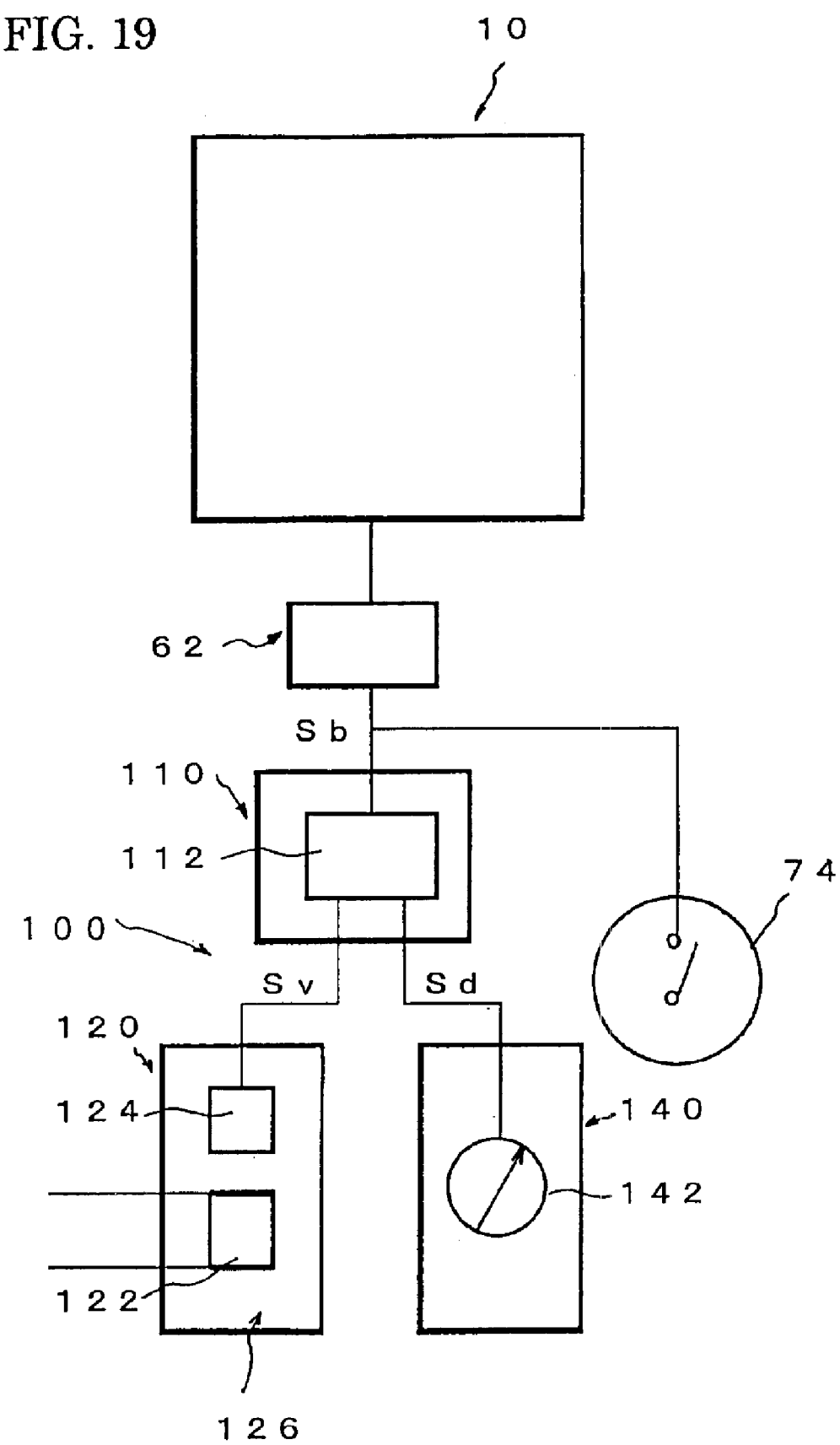
FIG. 19 is a schematic diagram of the normal travel security apparatus constructed in accordance with further preferred mode of embodiment of the invention.
Figure 20:
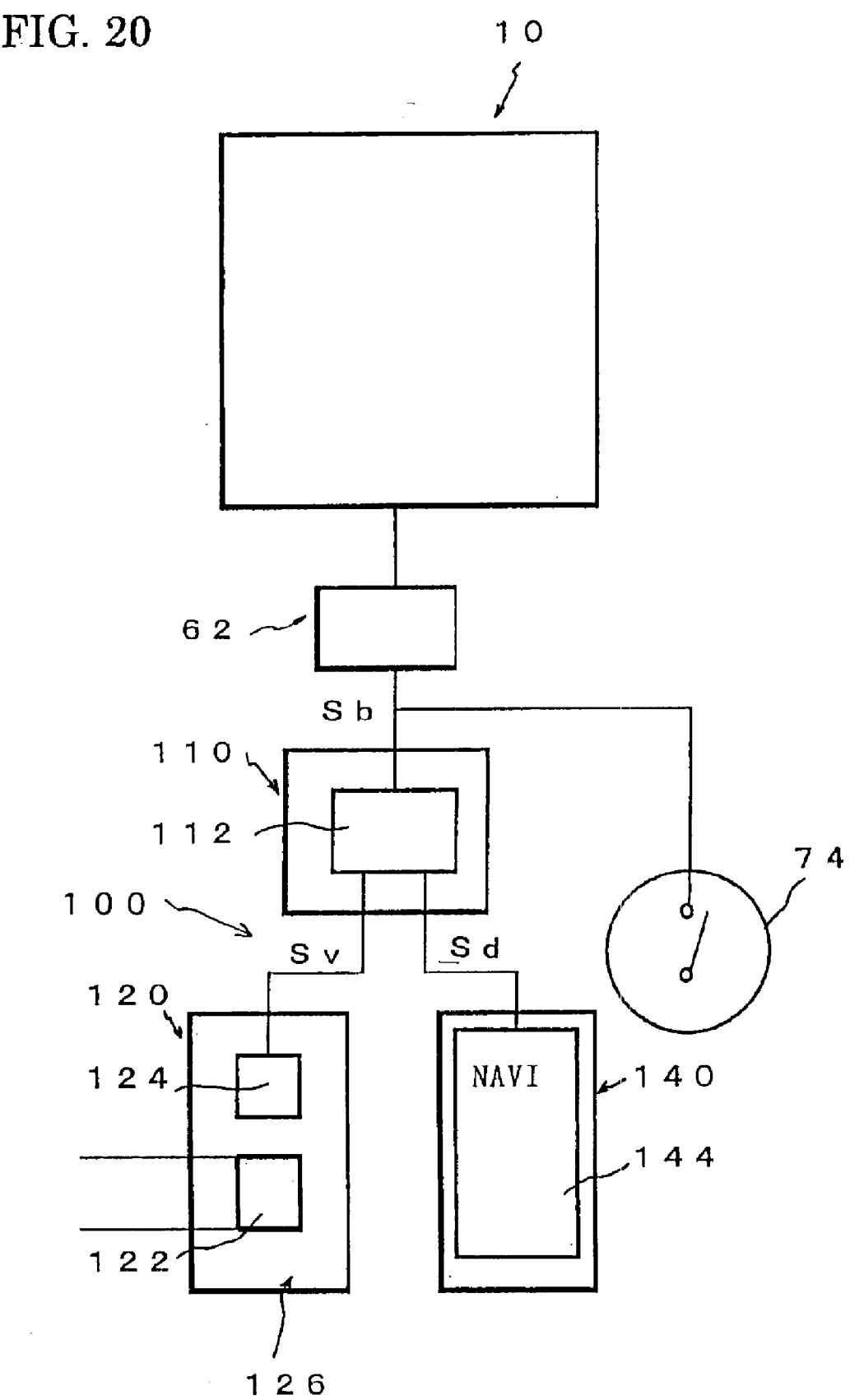
FIG. 20 is a schematic diagram of the normal travel security apparatus constructed in accordance with a modification of the mode of the embodiment of FIG. 19.

The normal travel security apparatus 100 in accordance with further mode of embodiment of the invention is shown in FIG. 19. This normal travel security apparatus 100 in accordance with this mode of embodiment is similar to the normal travel security apparatus 100 in accordance with further mode of embodiment of FIG. 14, but is adapted to actuate the lock actuator means 110 when the automobile travels for predetermined distance after it reaches the predetermined car speed Va, but not when the time limit elapses after it reaches the predetermined car speed Va.

More particularly, this normal travel security apparatus 100 has travel distance detection means 140 connected to the coupling signal generation means 112 of the lock actuator means 110 together with the car speed detection means 120. The travel distance detection means 140 may comprise a travel distance meter 142 such as a tachometer. The coupling signal generation circuit 112 of the lock actuator means 110 is so constructed as to begin to make a measurement of the output of the travel distance meter 142 after it receives the signal corresponding to the car speed Va from the car speed detection means 120 and generates the coupling signal Sb when the output reaches the predetermined distance Da (see FIG. 21).

Figure 21:
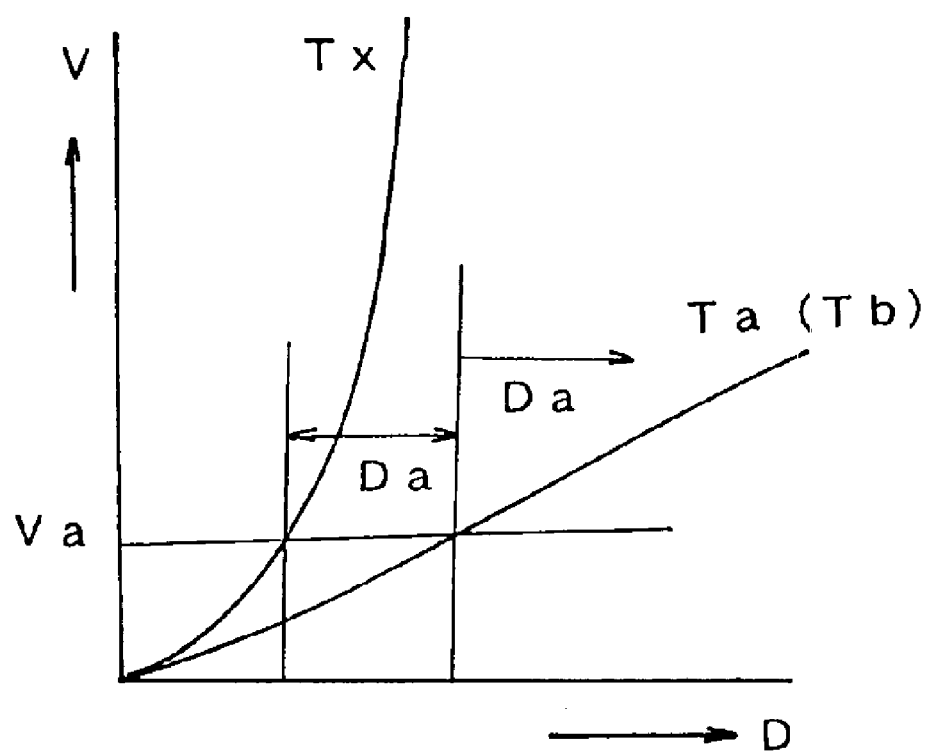
FIG. 21 is a diagram showing the relationship between a car speed V and a travel distance D for illustrating the operation of the apparatuses of FIGS. 19 and 20.

The predetermined car speed Va is set in the same manner as in the preceding modes of embodiment while the predetermined distance Da is at an appropriate value falling within the distance required to allow the accelerator erroneous operation prevention apparatus to work along the imaginary travel curve Tx by the operation other than the normal operation (the accelerator erroneous operation) as shown in FIG. 21, the distance of 10 m to 100 m, for instance and preferably 50 m to 100 m, but they sometimes differ in accordance with the displacement volume of the automobile, the vehicle weight and other conditions. In FIG. 21, the travel distance D on the horizontal axis gets larger as the car speed gets larger and therefore the scale of the horizontal axis is not equally spaced, but practically displayed with logarithmic scale. In this manner, the predetermined distance Da is set at a value for being able to prevent the erroneous operation, which happens from the car speed closer to, but less than the predetermined value Va for the same reason as in the case where the predetermined time limit Td of FIG. 14 or the predetermined travel time Tt of FIG. 17 is set.

Since the operation of the apparatus of FIG. 19 will be able to be understood from those of the three modes of embodiment already described, the detailed description will be omitted, but since the lock actuator means 110 is so adapted to be actuated with the delay of the predetermined travel distance Da even though the driver pushes down the accelerator pedal erroneously while mistaken for the brake pedal and the car speed instantly reaches the imaginary one Va, it can be positively distinguished from the case where the car speed reaches the predetermined value Va by the normal operation. In the former case, since the automobile is never accelerated by the working of the accelerator erroneous operation prevention apparatus before the lock means 62 is actuated, the accelerator erroneous operation can be effectively prevented.

In place of the travel distance meter 142 of the normal travel security apparatus 100 of FIG. 19, there may be used a satellite navigator 144 for a car which can be provided by combining an independence navigation (a guess navigation) and a global positioning system (GPS). The satellite navigator is always supervising the travel state including the travel distance of the automobile, the distance signal Sd corresponding to the travel distance D of the car after reaching the predetermined car speed Va can be input to the coupling signal generation circuit 112 of the lock actuator means 110.

The accelerator erroneous operation prevention apparatus 10 and the normal travel security apparatus 100 may be manufactured and sold as one assembly together with the accelerator pedal 14 and therefore can be easily attached also to the existing car. As for the existing car, the throttle cable 18 is directly connected to the accelerator arm 16 and the apparatus assembly of the invention can be assembled onto the existing car by removing this throttle cable 18 from the accelerator arm 16 and replacing the accelerator pedal and the accelerator arm of this existing by the apparatus assembly of the invention and connecting and attaching the throttle cable 18 to the acceleration function follow-up member (throttle interlocking member) 28 of the apparatus of the invention.

Although, in the aforementioned mode of embodiment, the invention is applied to the form of the erroneous operation prevention apparatus in which the magnetic coupling means 30 is directly attached to the accelerator arm 16 and the magnetic coupling is released by the leverage and the inertia moment, it may be similarly applied to the form in which the attraction plate 32 moves in a horizontal direction as shown in FIGS. 9 through 14 of W95/31349 and U.S. Pat. No. 5,797,467 and also to the form shown in FIGS. 15 through 24 thereof.

In the case where the lock means 62 is not in the form in which the solenoid 72 is energized on lock as shown in the form of FIGS. 9 and 10, but it is deenrgized on lock, the lock means 62 may be so constructed that the solenoid is energized as the coupling signal Sb in the form of zero signal disappears or an energization signal is generated on unlock.

Figure 22:
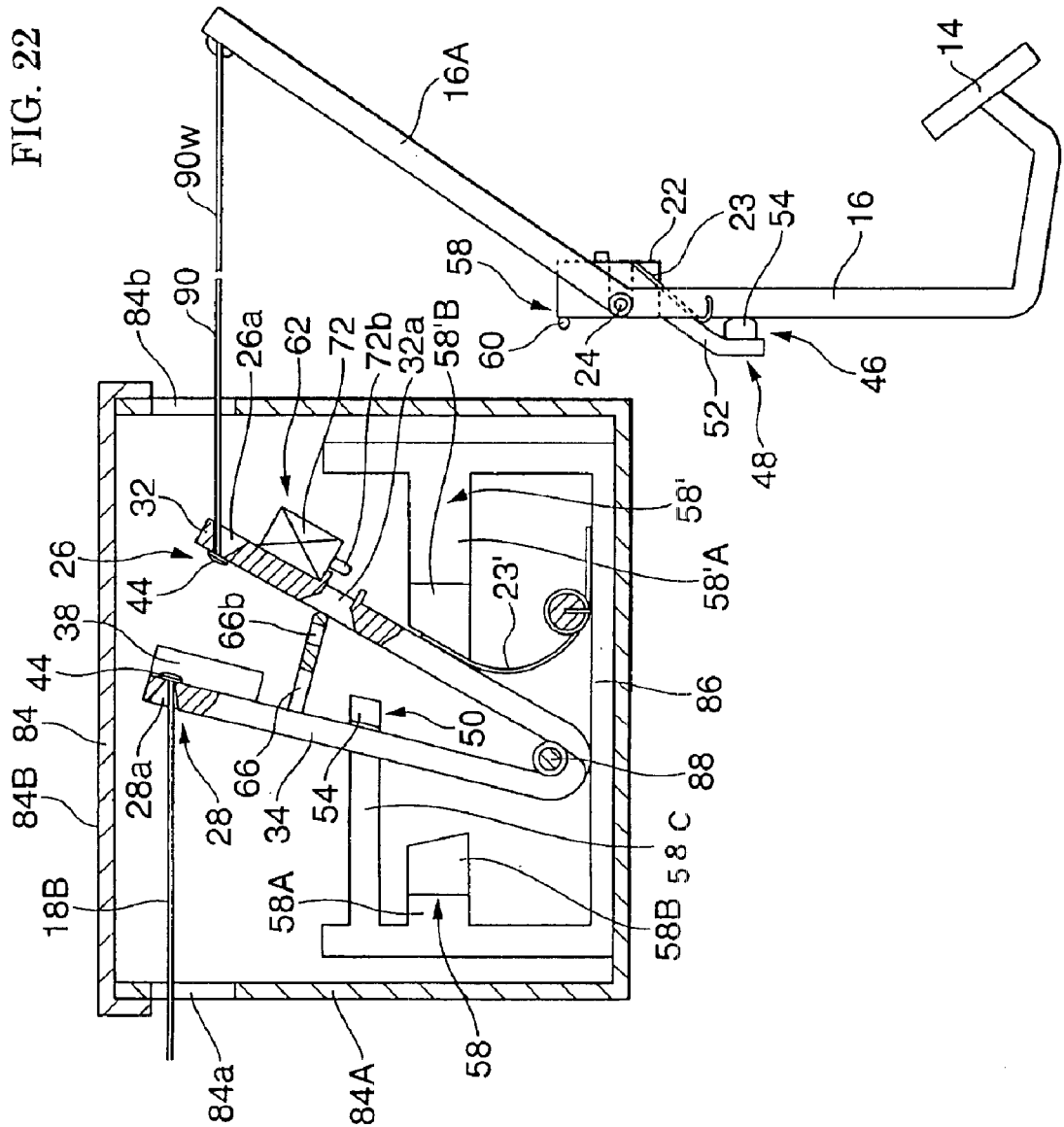
FIG. 22 is a schematic diagram of a further preferred mode of embodiment of the accelerator erroneous operation prevention apparatus to which the apparatus of the invention is applied with a portion thereof in cross section, but showing the state where the accelerator pedal is pushed down erroneously in place of the brake pedal.
Figure 23:
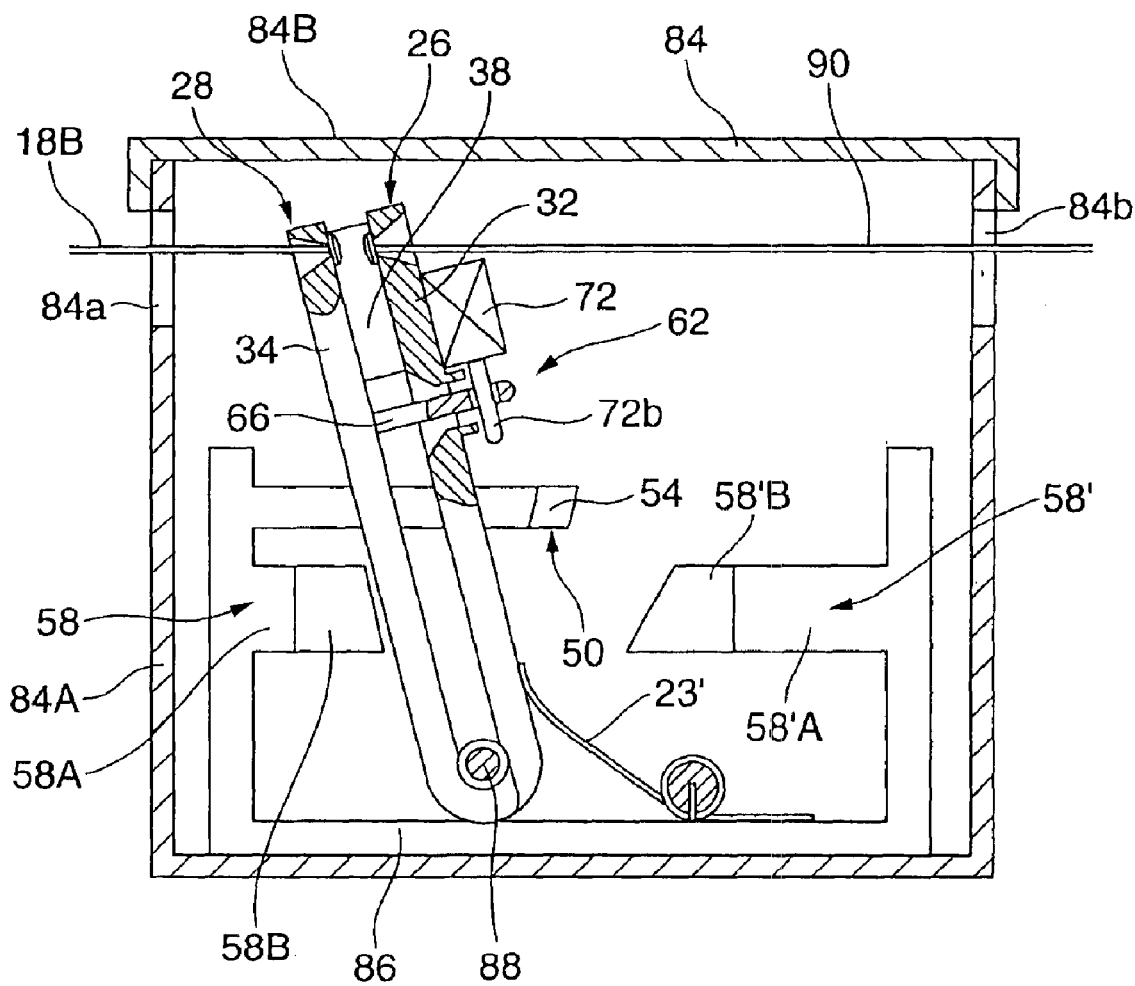
FIG. 23 is a schematic diagram identical to FIG. 22, but showing the state where the lock means is operated whereby the accelerator erroneous operation prevention apparatus does not work.
Figure 24:
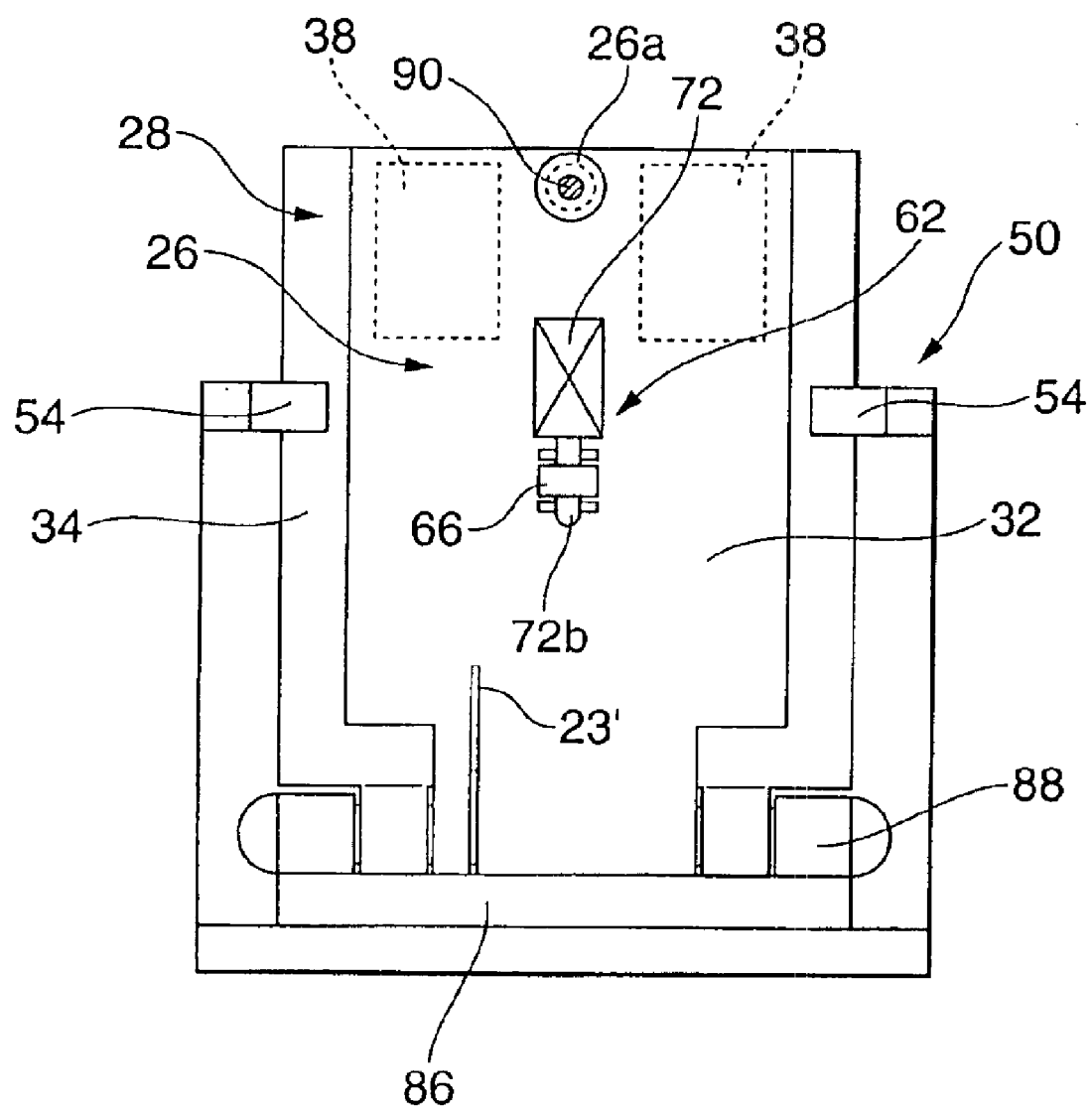
FIG. 24 is a front view of an internal construction of the apparatus shown in FIG. 23.

A further preferred mode of embodiment of the accelerator erroneous operation prevention apparatus to which the invention may be applied is shown in FIGS. 22 through 24.

This mode of embodiment is similar to that shown in FIGS. 9 through 14 of W95/31349 and U.S. Pat. No. 5,797,467 except that the accelerator interlocking member 26 and the acceleration function follow-up member 28 do not move in the horizontal direction within the casing, but they pivotally move.

Describing the accelerator erroneous operation prevention apparatus used for this mode of embodiment in details, as shown in FIGS. 22 through 24, the magnetic coupling means 30, the coupling release means 46 and the lock means 62 are disposed within a casing 84 to be attached to the car body. A base 86 may be provided within the casing 84 and the accelerator interlocking member 26 and the acceleration function follow-up member 28 of the magnetic coupling means 30 may be pivotally supported by a common support shaft 88 on the base 86. The casing 84 may comprise the box-like body 84A and a cover 84B and is closed by the cover 84B after main components of the apparatus are contained in the body 84A.

As shown in FIG. 24, in the illustrated mode, the accelerator interlocking member 26 and the acceleration function follow-up member 28 may be formed of substantially rectangle-like plate and in the illustrated mode, the two rectangular permanent magnets 38 may be attached on the side of the acceleration function follow-up member 28 and far away from the support shaft 88.

The acceleration function follow-up member 28 is connected to the cable body 18B of the throttle cable 18, which extends through an extension hole 84a in the casing 84 and into the casing 84 while the accelerator interlocking member 26 is connected to the upper half portion 16A of the accelerator arm 16 to which the accelerator pedal 14 is attached, by a connection member 90 extending though an extension hole 84b in the casing 84.

Thus, the accelerator interlocking member 26 may be formed of the attraction plate 32 itself to which the permanent magnets 38 are attracted, but not of the upper half portion 16A of the accelerator arm 16, which differs from the mode of FIGS. 2 through 6.

Since the accelerator interlocking member 26 and the acceleration function follow-up member 28 do not move in the horizontal direction within the casing 48, but they angularly (pivotally) move about the axis of the support shaft 88, the cable body 18B and the connection member 90 extend through tapered holes 28a and 26a enlarged in the opposite direction adjacent to the ends of the acceleration function follow-up member 28 and the accelerator interlocking member 26 far away from the support shaft 88 in the same manner as shown in FIG. 7 and removal prevention members 44 are attached to the ends faced to each other. Thus, the cable body 18B and the connection member 90 can be angularly adjusted relative to the acceleration function follow-up member 28 and the accelerator interlocking member 26 in spite of the angular movement thereof.

Since the cable body 18B and the connection member 90 are vertically displaced in accordance with the angular movement of the acceleration function follow-up member 28 and the accelerator interlocking member 26 (relatively see FIGS. 22 and 23), the extension holes 84a and 84b through which the cable body 18B and the connection member 90 extend are formed longwise so that the members can be displaced vertically within the extension holes 84a and 84b.

In the illustrated mode, since the connection member 90 is formed of a flexible wire 90W such as a wire, an acceleration return spring 23 does not act on the accelerator interlocking member 26 and therefore, a separate return spring 23' is disposed between the accelerator interlocking member 26 and the base 86 so as to apply a return action to the accelerator interlocking member 26. If the connection member 90 connecting the accelerator interlocking member 26 and the accelerator arm 16 is not formed of the wire, but of a rigid connecting rod, since the accelerator interlocking member 26 is automatically retuned by a spring return force applied to the accelerator arm 16, the separate return spring is not required.

In the mode of FIGS. 22 through 24, there are provided for both of the acceleration function follow-up member 28 and the accelerator interlocking member 26 position regulation means 58 and 58' comprising position regulation members 58A and 58'A raising up from the base 86 and horizontally extending in a direction in which they get closer to each other. The position regulation means 58 has an acceleration function side buffer member 58B attached to the leading end of the position regulation member 58 and against which the acceleration function follow-up member 28 abuts in the non-acceleration state of the acceleration function follow-up member 28 and the position regulation means 58' has an accelerator side buffer member 58'B attached to the leading end of the position regulation member 58' and against which the accelerator interlocking member 26 abuts at the position exceeding the maximum acceleration position of the accelerator interlocking member 26. As shown in FIG. 22, the stop member 60 for the accelerator arm is provided on the base 22, but it may be necessarily not provided in the case where the connection member 90 is formed of the rigid connecting rod.

The first stop member 48 of the coupling release means 46 is completely identical to the form of FIGS. 2 through 6 while the stop member 54 of the second stop member 50 is provided on a leading end of an arm 58C extending from the upper end of the raising up portion of the base 86 and above and in parallel to the position regulation member 58A.

The lock means 62 comprises a linear solenoid 72 attached to the back face of the attraction plate 32 of the accelerator interlocking member 26 (a face opposite to a side facing the acceleration function follow-up member 28) and a lock arm 66 attached adjacent to the middle of the acceleration function follow-up member 28 and extending a corresponding extension hole 32a in the attraction plate 32. The lock arm 66 has an engagement hole 66b into which the pushing rod 72b provided on the armature of the solenoid 72 is engaged. The extension hole 32a is tapered so that the lock arm 66 never interferes with the accelerator interlocking member 26 when the accelerator erroneous operation prevention function is performed and when the acceleration function follow-up member 28 moves away from the accelerator interlocking member 26.

Although the detailed description of the accelerator erroneous operation prevention function of this mode of embodiment will be omitted because it is fully identical to that of the form of FIGS. 2 through 6, since in this form the magnetic coupling means 30, the coupling release means 46 and the lock means 62 are disposed within the casing 84 to be attached to the car body, the accelerator erroneous operation prevention apparatus 10 can be removably mounted on the car body separately therefrom. This is preferable because the accelerator arm 16 does not form a part of the magnetic coupling means 30 in the same manner as the form of FIGS. 9 through 14 of WO95/31349 and U.S. Pat. No. 5,797,467 already proposed by the applicant to thereby more easily assemble the accelerator erroneous operation prevention apparatus 10, but since the acceleration flnction follow-up member 28 and the accelerator interlocking member 26 of the magnetic coupling means 30 are pivotally supported within the casing 84, there is generated no coupling sound of the two members 28 and 26, which tends to be generated in the case where the two members 28 and 26 are coupled and released by the linear movement of the two members 28 and 26 and also the coupling and release of the two members 28 and 26 can be smoothly and precisely be performed.

Especially, as there are provided the acceleration function side buffer member 58B against which the acceleration function follow-up member 28 abuts in the non-acceleration state of the acceleration function follow-up member 28 within the casing 84 and the accelerator side buffer member 58'B against which the accelerator interlocking member 26 abuts at the position exceeding the maximum acceleration position of the accelerator interlocking member 26, the generation of an abutting sound of the two members 28 and 26 on the stopping of the acceleration function and on the prevention of the erroneous operation as well as the sound on the coupling of the two members 28 and 26 can be prevented whereby there can be effectively prevented the generation of the sound due to the operation of the accelerator pedal of the automobile including the erroneous operation prevention.

Although the invention may be similarly applied to an electric car other than the gasoline car, in the case where it is applied to the electric car, the acceleration function follow-up member 28 is constructed in the same manner as the case of the gasoline car except that the erroneous operation signal is generated when the magnetic coupling means is released from a switch element associated with the speed adjusting device such as a speed adjusting variable resistance, but not with the throttle cable of the gasoline car and corresponding to the switch element 80 to thereby disable the operation of a motor which is a primer of the electric car.

Although, in the illustrated mode, the actuator 68 of the lock means comprises the electro-magnetically operated solenoid 72, it may comprise any other arbitrary actuator such as an electric motor or an oil pressure motor, which can be electrically controlled. Although, in the mode of FIGS. 22 through 24, the accelerator interlocking member 26 and the acceleration function follow-up member 28 are pivotally supported adjacent to the floor within the casing 84, the pivotal position of the members may be arbitrarily set so long as they can pivotally move following the movement of the accelerator arm 16.

In accordance with the invention, since the lock means is held in the lock state so as to mechanically couple the accelerator interlocking member and the acceleration function follow-up member when the car speed equal to and more than the predetermined value is detected on the normal operation, the accelerator erroneous operation prevention apparatus can be disabled without any requirement of the troublesome operation of the driver's manually switching in the normal travel state of the automobile. Thus, the accelerator erroneous operation prevention apparatus never works even though the accelerator pedal is abruptly pushed down with the big force, which will be done in the case where the overtaking operation is performed during the high-speed travel on the highway or during the uphill travel and therefore the overtaking operation can be safely performed.

Since the lock means is held in the lock state when the predetermined travel time is detected after the acceleration or with the time lag after the predetermined car speed is reached as well as when the car speed equal to or more than the predetermined value is detected, the car speed equal to or more than the predetermined value in the normal operation state can be positively distinguished from the short time acceleration due to the accelerator erroneous operation and therefore there is no trouble to the prevention of the accelerator erroneous operation.

Furthermore, as the acceleration function follow-up member and the accelerator interlocking member of the magnetic coupling means are pivotally supported within the casing, there can be effectively prevented the generation of the coupling sound of the two members, which tends to be generated in the case where the two members are coupled and released by the linear movement thereof and the coupling and the release of the two members can be positively and precisely performed.

Especially, as there are provided within the casing the acceleration function side buffer member against which the acceleration function follow-up member abuts in the non-acceleration state of the acceleration function follow-up member and the accelerator side buffer member against which the accelerator interlocking member abuts at the position exceeding the maximum acceleration position of the accelerator interlocking member, the generation of the abutting sound of the two members on the stopping of the acceleration function and on the prevention of the erroneous operation as well as the sound on the coupling of the two members can be prevented whereby there can be effectively prevented the generation of the sound due to the operation of the accelerator pedal of the automobile including the erroneous operation prevention.

UTILIZABILITY FOR INDUSTRIES

This invention effectively achieves the function of the acceleration for the overtaking operation and the uphill travel in the normal travel state of the automobile equipped with the apparatus for preventing the erroneous operation in which the accelerator pedal is pushed down while mistaken for the brake pedal and is suitable for the automobile for positively and properly using both of the accelerator erroneous operation prevention function and the normal operation function.

What is claimed is:

1. A normal travel security apparatus for an automobile equipped with an accelerator erroneous operation prevention apparatus comprising magnetic coupling means to magnetically couple with each other in a normal state an accelerator interlocking member interlocking with an accelerator pedal of said automobile and an acceleration function follow-up member associated with speed adjustment means for adjusting the speed of said automobile, coupling release means to release the magnetic coupling of said accelerator interlocking member and said acceleration function follow-up member when said accelerator pedal is erroneously pushed down in place of a brake pedal and lock means to lock said coupling release means so that said coupling release means does not mechanically couple said accelerator interlocking member and said acceleration function follow-up member, said normal travel security apparatus comprising lock activation means to maintain said lock means locked when said automobile travels at a speed equal to or more than a predetermined speed based on a normal operation of said automobile.

2. A normal travel security apparatus for an automobile equipped with an accelerator erroneous operation prevention apparatus according to claim 1, wherein said lock means comprises an actuator provided between said accelerator interlocking member and said acceleration function follow-up member to be operated while electrically controlled so that said accelerator interlocking member and said acceleration function follow-up member are mechanically coupled or the coupling of them is released and wherein said lock release means comprises a coupling signal generation circuit to generate a coupling signal to drive said actuator so that said accelerator interlocking member and said acceleration function follow-up member are mechanically coupled.

3. A normal travel security apparatus for an automobile equipped with an accelerator erroneous operation prevention apparatus comprising magnetic coupling means to magnetically couple with each other in a normal state an accelerator interlocking member interlocking with an accelerator pedal of said automobile and an acceleration function follow-up member associated with speed adjustment means for adjusting the steed of said automobile, coupling release means to release the magnetic coupling of said accelerator interlocking member and said acceleration function follow-up member when said accelerator pedal is erroneously pushed down in place of a brake pedal and lock means to lock said coupling release means so that said coupling release means does not mechanically couple said accelerator interlocking member and said acceleration function follow-up member, said normal travel security apparatus comprising car speed detection means to detect a car speed of said automobile and lock activation means to maintain said lock means locked when it is determined that the car speed detected by said car speed detection means is of a value equal to or more than a predetermined speed and that the car speed equal to or more than said predetermined speed is based on a normal operation of said automobile.

4. A normal travel security apparatus for an automobile equipped with an accelerator erroneous operation prevention apparatus according to claim 3, wherein said lock means comprises an actuator provided between said accelerator interlocking member and said acceleration function follow-up member to be operated while electrically controlled so that said accelerator interlocking member and said acceleration function follow-up member are mechanically coupled or the coupling of them is released and wherein said lock release means comprises a coupling signal generation circuit to generate a coupling signal to drive said actuator so that said accelerator interlocking member and said acceleration function follow-up member are mechanically coupled.

5. A normal travel security apparatus for an automobile equipped with an accelerator erroneous operation prevention apparatus according to claim 4, wherein said magnetic coupling means, said coupling release means and said lock means are disposed within a casing to be attached to a car body, said acceleration function follow-up member and said accelerator interlocking member of said magnetic coupling means are pivotally supported on and within said casing and said accelerator interlocking member is connected by a connecting member extending through an extension hole in said casing to an accelerator arm to which said accelerator pedal is attached.

6. A normal travel security apparatus for an automobile equipped with an accelerator erroneous operation prevention apparatus comprising magnetic coupling means to magnetically couple with each other in a normal state an accelerator interlocking member interlocking with an accelerator pedal of said automobile and an acceleration function follow-up member associated with speed adjustment means for adjusting the speed of said automobile, coupling release means to release the magnetic coupling of said accelerator interlocking member and said acceleration function follow-up member when said accelerator pedal is erroneously pushed down in place of a brake pedal and lock means to lock the coupling release means so that said coupling release means does not mechanically couple said accelerator interlocking member and said acceleration function follow-up member, said normal travel security apparatus comprising car speed detection means to detect a car speed of said automobile and lock activation means to maintain said lock means locked with a predetermined time lag after said car speed detection means detects a car speed equal to or more than a predetermined speed.

7. A normal travel security apparatus for an automobile equipped with an accelerator erroneous operation prevention apparatus according to claim 6, wherein said lock means comprises an actuator provided between said accelerator interlocking member and said acceleration function follow-up member to be operated while electrically controlled so that said accelerator interlocking member and said acceleration function follow-up member are mechanically coupled or the coupling of them is released and wherein said lock release means comprises a coupling signal generation circuit to generate a coupling signal to drive said actuator so that said accelerator interlocking member and said acceleration function follow-up member are mechanically coupled, said coupling signal generation circuit serving to generate said coupling signal with said predetermined time lag after receiving a car speed detection signal corresponding to said car speed equal to or more than said predetermined speed from said car speed detection means.

8. A normal travel security apparatus for an automobile equipped with an accelerator erroneous operation prevention apparatus comprising magnetic coupling means to magnetically couple with each other in a normal state an accelerator interlocking member interlocking with an accelerator pedal of said automobile and an acceleration function follow-up member associated with speed adjustment means for adjusting the speed of said automobile, coupling release means to release the magnetic coupling of said accelerator interlocking member and said acceleration function follow-up member when said accelerator pedal is erroneously pushed down in place of a brake pedal and lock means to lock said coupling release means so that said coupling release means does not mechanically couple said accelerator interlocking member and said acceleration function follow-up member, said normal travel security apparatus comprising car speed detection means to detect a car speed of said automobile, travel time detection means to detect a travel time after said automobile starts to be accelerated from a state where said car speed is lower than a predetermined speed and lock activation means to maintain said lock means locked when said car speed detection means detects a car speed equal to or more than said predetermined speed and said travel time detection means detects a predetermined travel time.

9. A normal travel security apparatus for an automobile equipped with an accelerator erroneous operation prevention apparatus according to claim 8, wherein said lock means comprises an actuator provided between said accelerator interlocking member and said acceleration function follow-up member to be operated while electrically controlled so that said accelerator interlocking member and said acceleration function follow-up member are mechanically coupled or the coupling of them is released and wherein said lock release means comprises a coupling signal generation circuit to generate a coupling signal to drive said actuator so that said accelerator interlocking member and said acceleration function follow-up member are mechanically coupled, said coupling signal generation circuit serving to generate said coupling signal when receiving a car speed detection signal corresponding to said car speed equal to or more than said predetermined speed from said car speed detection means and a travel time detection signal detecting a predetermined travel time from said travel time detection means.

10. A normal travel security apparatus for an automobile equipped with an accelerator erroneous operation prevention apparatus according to claim 8, wherein said lock means comprises an actuator provided between said accelerator interlocking member and said acceleration function follow-up member to be operated while electrically controlled so that said accelerator interlocking member and said acceleration function follow-up member are mechanically coupled or the coupling of them is released and wherein said lock release means comprises a coupling signal generation circuit to generate a coupling signal to drive said actuator so that said accelerator interlocking member and said acceleration function follow-up member are mechanically coupled, said coupling signal generation circuit serving to generate said coupling signal when said automobile travels for said predetermined distance after receiving a car speed detection signal corresponding to said car speed equal to or more than said predetermined speed from said car speed detection means.

11. A normal travel security apparatus for an automobile equipped with an accelerator erroneous operation prevention apparatus comprising magnetic coupling means to magnetically couple with each other in a normal state an accelerator interlocking member interlocking with an accelerator pedal of said automobile and an acceleration function follow-up member associated with speed adjustment means for adjusting the speed of said automobile, coupling release means to release the magnetic coupling of said accelerator interlocking member and said acceleration function follow-up member when said accelerator pedal is erroneously pushed down in place of a brake pedal and lock means to lock the coupling release means so that said coupling release means does not mechanically couple said accelerator interlocking member and said acceleration function follow-up member, said normal travel security apparatus comprising car speed detection means to detect a car speed of said automobile and lock activation means to maintain said lock means locked when the travel of said automobile for a distance equal to or more than a predetermined distance is detected after said car speed detection means detects a car speed equal to or more than a predetermined speed.

12. A normal travel security apparatus for an automobile equipped with an accelerator erroneous operation prevention apparatus according to anyone of claims 1 through 10, wherein said magnetic coupling means, said coupling release means and said lock means are disposed within a casing to be attached to a car body, said acceleration function follow-up member and said accelerator interlocking member of said magnetic coupling means are pivotally supported on and within said casing and said accelerator interlocking member is connected by a connecting member extending through an extension hole in said casing to an accelerator arm to which said accelerator pedal is attached.

13. A normal travel security apparatus for an automobile equipped with an accelerator erroneous operation prevention apparatus according to claim 12, wherein there are provided in said casing an acceleration function side buffer member against which said acceleration function follow-up member abuts in a non-acceleration state of said acceleration function follow-up member and an accelerator side buffer member against which said accelerator interlocking member abuts at the position beyond the maximum acceleration position of said accelerator interlocking member.

* * * * *